US006861647B2

(12) United States Patent
Reilly et al.

(10) Patent No.: US 6,861,647 B2
(45) Date of Patent: Mar. 1, 2005

(54) METHOD AND APPARATUS FOR MASS SPECTROMETRIC ANALYSIS OF SAMPLES

(75) Inventors: James P. Reilly, Bloomington, IN (US); Kirk S. Boraas, Bloomington, IN (US)

(73) Assignee: Indiana University Research and Technology Corporation, Indianapolis, IN (US)

(*) Notice: Subject to any disclaimer, the term of this patent is extended or adjusted under 35 U.S.C. 154(b) by 0 days.

(21) Appl. No.: 10/603,527

(22) Filed: Jun. 25, 2003

(65) Prior Publication Data

US 2004/0183010 A1 Sep. 23, 2004

Related U.S. Application Data

(60) Provisional application No. 60/455,716, filed on Mar. 17, 2003.

(51) Int. Cl.[7] .................... G01N 24/00

(52) U.S. Cl. .................... 250/288; 250/423 R; 250/425; 436/47; 436/173

(58) Field of Search .................... 250/288, 423 R, 250/425, 281, 282; 436/47, 173

(56) References Cited

U.S. PATENT DOCUMENTS

| | | | | |
|---|---|---|---|---|
| 4,740,298 A | | 4/1988 | Andresen et al. | |
| 4,803,355 A | | 2/1989 | Takahashi | |
| 4,867,947 A | | 9/1989 | Andresen et al. | |
| 5,037,611 A | * | 8/1991 | Ledford, Jr. | 422/63 |
| 5,372,862 A | | 12/1994 | Krishnaswamy | |
| 5,572,025 A | | 11/1996 | Cotter et al. | |
| 5,612,887 A | | 3/1997 | Laube et al. | |
| 5,624,722 A | | 4/1997 | Nagaishi et al. | |
| 5,696,376 A | | 12/1997 | Doroshenko et al. | |
| 5,763,875 A | | 6/1998 | Kaesdorf et al. | |
| 5,841,136 A | | 11/1998 | Holle et al. | |
| 5,917,185 A | | 6/1999 | Yeung et al. | |
| 5,959,297 A | * | 9/1999 | Weinberg et al. | 250/288 |
| 5,965,884 A | | 10/1999 | Laiko et al. | |
| 6,086,366 A | | 7/2000 | Mueller et al. | |
| 6,175,112 B1 | | 1/2001 | Karger et al. | |
| 6,278,794 B1 | | 8/2001 | Parekh et al. | |
| 6,282,213 B1 | | 8/2001 | Gutin et al. | |
| RE37,485 E | * | 12/2001 | Vestal | 436/47 |
| 6,348,688 B1 | | 2/2002 | Vestal | |
| 6,414,306 B1 | | 7/2002 | Mayer-Posner et al. | |
| 6,444,980 B1 | | 9/2002 | Kawato et al. | |
| 2001/0033809 A1 | | 10/2001 | Karger et al. | |

* cited by examiner

*Primary Examiner*—Nikita Wells
*Assistant Examiner*—Zia R. Hashmni
(74) *Attorney, Agent, or Firm*—Barnes & Thornburg LLP

(57) ABSTRACT

An MALDI mass spectrometer for the composition analysis of large batch sizes of samples includes a mass spectrometer having an ionization chamber and a sample chamber coupled to the ionization chamber. A transport cart is positioned in the sample chamber with a sample cassette removably coupled thereto. A method of operating a MALDI mass spectrometer is also disclosed.

13 Claims, 28 Drawing Sheets

METHOD AND APPARATUS FOR MASS SPECTROMETRIC ANALYSIS OF SAMPLES

This application claims priority under 35 U.S.C. § 119(e) to U.S. Provisional Patent Application Ser. No. 60/455,716 entitled "A Method and Apparatus for Analyzing the Composition of a Sample" which was filed on Mar. 17, 2003 by J. Reilly and K. Boraas, the entirety of which is expressly incorporated by reference herein.

TECHNICAL FIELD OF THE DISCLOSURE

The present disclosure relates generally to composition analysis. In particular, the present disclosure relates to an apparatus and method for the composition analysis, for example mass spectrometric analysis, of large batch sizes of samples.

BACKGROUND OF THE DISCLOSURE

Typically, large numbers of mass spectrometer targets, in particular Matrix-Assisted Laser Desorption/Ionization (MALDI) mass spectrometer targets, are difficult to process in a single batch. The batch size is often limited by the number of targets that can be applied in rows and columns on a sample plate. A small batch size requires frequent opening and closing of the mass spectrometer vacuum chamber, thereby slowing the overall analysis process. Additionally, small batch sizes may create difficulties in performing MALDI mass spectrometric analysis on the entire effluent of a capillary chromatographic assay. The small batch sizes normally require that only intermittent sample portions of the effluent be subjected to mass spectrometric examination.

A typical sample substrate used in mass spectrometric analysis consists of a metal plate. Processing large batch sizes of samples using traditional MALDI metal plate substrates may be expensive due to the relative high cost of the MALDI metal plate substrates. Additionally, the archiving of samples that have been subjected to MALDI mass spectrometric analysis using traditional metal plate substrates may be costly due to the decreased future usefulness and the required metal plate substrates. Large volume substrates may reduce the cost inherent in processing large batch sizes of samples. However, large volume substrates present their own set of challenges such as the control of outgassing when the substrate is first subjected to a vacuum. In particular, the generally larger surface area of large volume substrates may outgass more than smaller substrates. Excessive outgassing may adversely affect the MALDI mass spectrometric analysis. Accordingly, an apparatus and method that supports the spectrometric analysis of large batch sizes is desirable.

SUMMARY OF THE DISCLOSURE

According to one aspect of the disclosure, an apparatus for analyzing the composition of a sample is provided. The apparatus includes a mass spectrometer having an ionization chamber, a sample chamber coupled to the ionization chamber, a transport cart disposed within the sample chamber and formed to receive a sample cassette, and a sample cassette removably coupled to the transport cart.

According to another aspect of the disclosure, a sample cassette is provided. The sample cassette includes a platform, a first sample substrate reel and a second sample substrate reel coupled to the platform, a sample substrate, a sample substrate conduit coupled to the platform, and a sample substrate stage coupled to the platform.

According to another aspect of the disclosure, a sample cassette transport cart is provided. The sample cassette transport cart includes a front and a rear flange, a plurality of guide rails coupled to the front and rear flanges, a platform formed to receive a sample cassette, the platform coupled to the guide rails, a plurality of reel driving spindles coupled to the platform, and means for moving the platform along the guide rails from a first position to a second position.

According to yet another aspect of the disclosure, a method for analyzing the composition of a sample is provided. The method includes reducing the pressure of an ionization chamber to a first pressure, disposing a plurality of sample aliquots on a sample substrate, coupling the sample substrate to a sample cassette, loading the sample cassette onto a sample cassette transport cart disposed within a sample chamber, reducing the pressure of the sample chamber to a second pressure, opening the interconnecting gate valve, moving the sample cassette towards an aperture defined within an interface wall, and ionizing a first sample aliquot.

According to still another aspect of the disclosure, a composition analysis apparatus is provided. The composition analysis apparatus includes a mass spectrometer having an ionization chamber, a sample chamber coupled to the ionization chamber, and a vacuum system coupled to the ionization chamber and the sample chamber thereby reducing the ionization chamber to a first pressure and the sample chamber to a second pressure. The first pressure is substantially unequal to the second pressure.

According to a further aspect of this disclosure, a method for composition analysis is provided. The method includes disposing a plurality of sample aliquots on a flexible sample substrate under atmospheric pressure, advancing a portion of the flexible sample substrate into an ionization chamber, and ionizing a first sample aliquot.

According to yet a further aspect of this disclosure, a sample cassette is provided. The sample cassette includes a support member, a conduit attached to the support member, and a stage attached to the support member so that the stage is positioned adjacent to an end of the conduit. The stage is formed from a material that is electrically conductive relatively to a material the conduit is formed from.

According to still a further aspect of the disclosure, an arrangement for conducting mass spectrometry is provided. The arrangement includes a first chamber, a second chamber adjacent to the first chamber, an interface wall interposed the first chamber and the second chamber, an aperture defined in the interface wall, a gate valve operable to separate the chambers, and a sample cassette having (i) a support member, (ii) a conduit attached to the support member, and (iii) a stage attached to the support member so that the stage is positioned adjacent to an end of the conduit. The sample cassette is positioned relative to the interface wall so that the stage extends into the aperture and the conduit is in fluid communication with the first chamber and the second chamber.

BRIEF DESCRIPTION OF THE DRAWINGS

The detailed description particularly refers to the accompanying figures in which.

DETAILED DESCRIPTION OF THE DISCLOSURE

Figure 1:
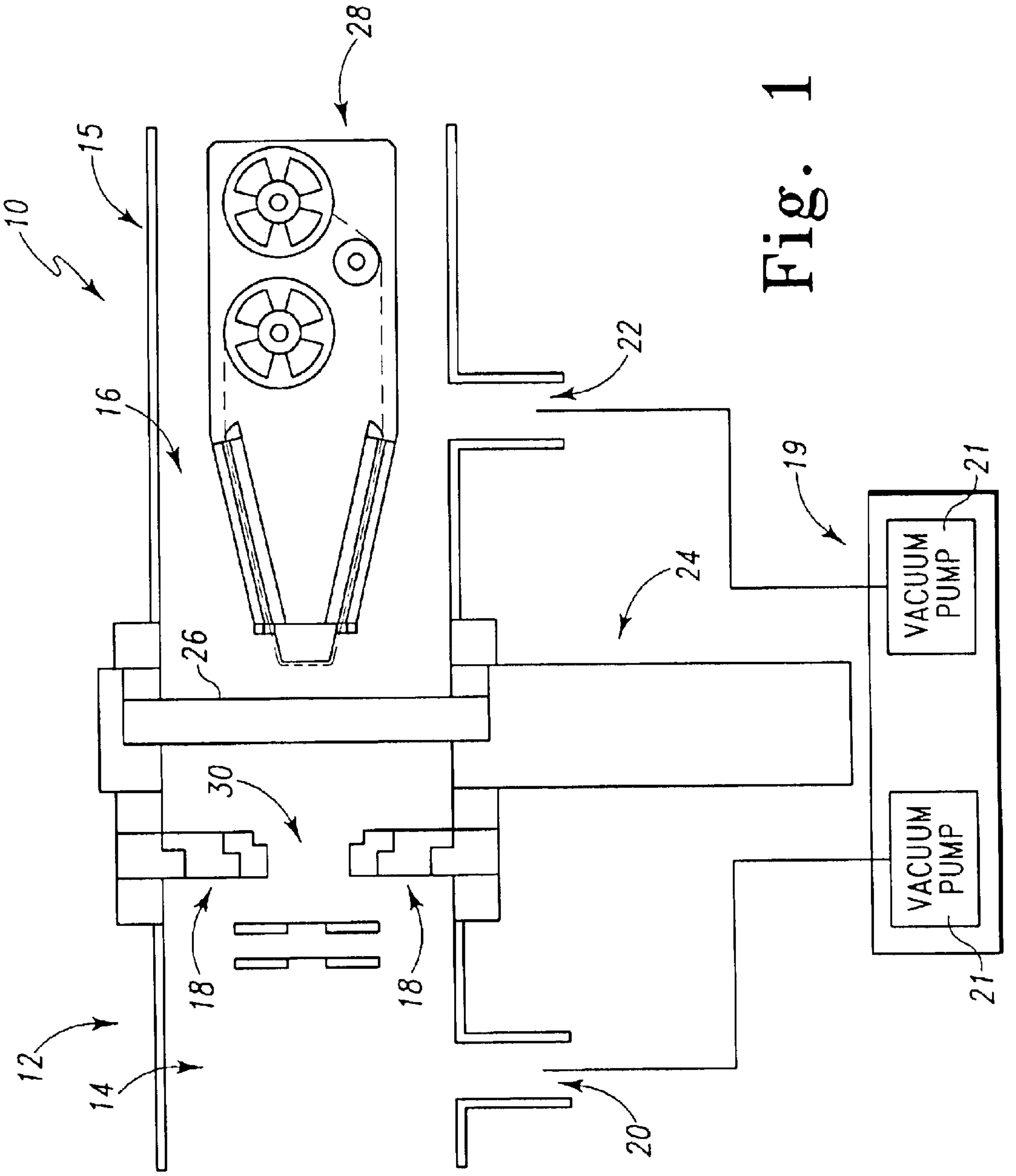
FIG. 1 is a diagrammatic view of a MALDI mass spectrometer.

While the disclosure is susceptible to various modifications and alternative forms, specific embodiments thereof have been shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the invention as defined by the appended claims.

Referring now to FIG. 1, there is shown a MALDI mass spectrometer 10. The MALDI mass spectrometer 10 includes a time-of-flight (TOF) mass spectrometer 12 having an ionization chamber 14, and a sample staging assembly 15 having a sample chamber 16. Each of the chambers 14, 16 has a vacuum port 20, 22, respectively, associated therewith. An interface wall 18 is positioned between the chambers 14, 16. The chambers 14, 16 are fluidly coupled to one another via a cassette-docking aperture 30 defined in the interface wall 18. The ionization chamber 14 may be separated and pneumatically sealed from the sample chamber 16 by a gate valve 24. In particular, the gate valve 24 includes a gate door 26 which is movable between a closed position in which the ionization chamber 14 is sealed from the sample chamber 16 (see FIG. 1) and an open position in which fluid (i.e., pneumatic) communication is permitted between the chambers 14, 16. Illustratively, the gate door 26 moves in a lateral direction to selectively separate and pneumatically seal each of the chambers 14, 16 from one another. However, gate valves having other configurations for separating and sealing the chambers 14, 16 may be used. For example, an iris-like sealing door or a combination of smaller doors which cooperate together to seal the chambers 14, 16 may be used.

The MALDI mass spectrometer 10 further includes a differential vacuum system 19 fluidly coupled to chambers 14, 16 via vacuum ports 20, 22, respectively. The differential vacuum system 19 facilitates the reduction and maintenance of the pressure in the ionization chamber 14 at a first pressure and the reduction and maintenance of the pressure in the sample chamber 16 to a second, generally higher pressure. Illustratively, the differential vacuum system 19 includes two independent and separate vacuum sources such as vacuum pumps 21, each of which is fluidly coupled to one of the vacuum ports 20, 22. Each of the pumps 21 may be embodied, for example, as a turbo molecular pump such as a model number TW300 pump which is commercially available from Leybold Vacuum USA, Incorporated of Export, Pennsylvania. Such pumps have a pumping rate of about 230 liters per second. It should be appreciated that other types of pumps such as cryopumps, diffusion pumps or the like may also be used.

Figure 2:
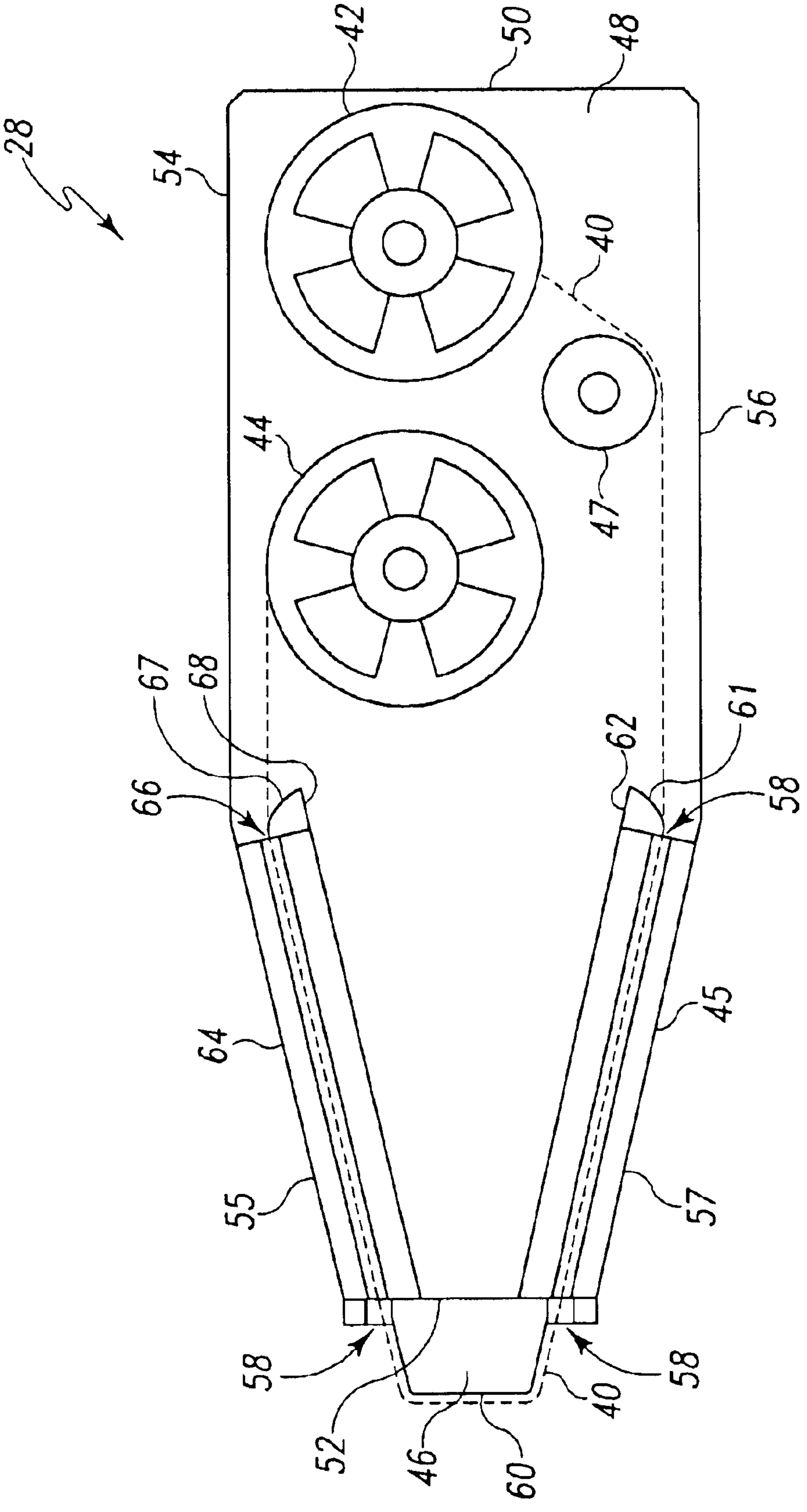
FIG. 2 is an enlarged diagrammatic view of the sample cassette of the MALDI mass spectrometer of FIG. 1.
Figure 3:
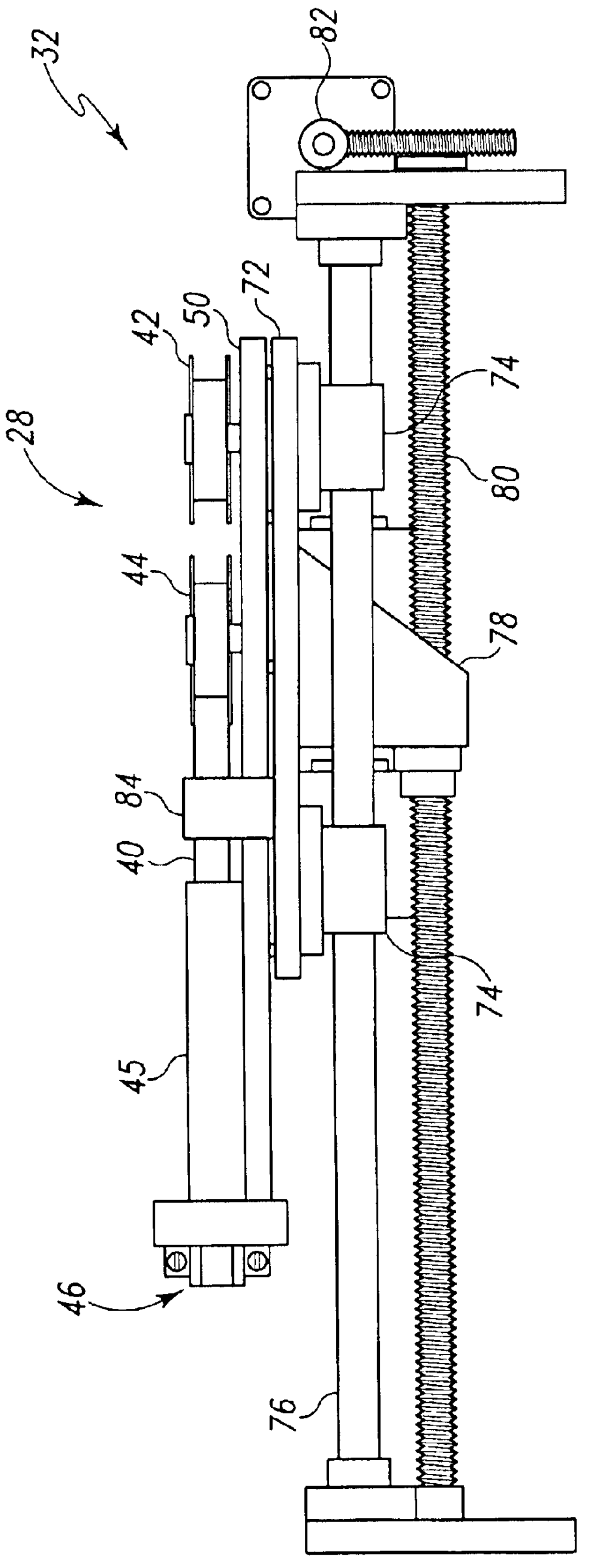
FIG. 3 is a side elevational view of the sample cassette of FIG. 2 showing the sample cassette positioned on a transport cart.

As shown in FIG. 3, a sample cassette transport cart 32 is positioned in the sample chamber 16. The transport cart 32 is configured to support and transport a sample cassette 28 within the sample chamber 16. As shown in FIG. 2, the sample cassette 28 includes a platform 48, a flexible sample substrate 40, a supply reel 42, a take-up reel 44, at least one sample substrate conduit 45, and a sample substrate stage 46. Additionally, the cassette 28 may include a direction roller 47 rotatably coupled to the platform 48 to alter the direction of the sample substrate 40.

Illustratively, the platform 48 has a generally tapered shape. In particular, the platform 48 has a first side edge 50, a top edge 54, a bottom edge 56, a first inwardly sloping edge 55, a second inwardly sloping edge 57, and a second side edge 52. As will be described herein in greater detail, such a configuration facilitates operation of the sample cassette 28.

Illustratively, the sample substrate 40 is a tape-like medium, for example polymer tape, upon which sample aliquots may be disposed. The sample substrate 40 may include an opaque coating on one of its surfaces. The sample substrate 40 is directed along a path defined by the components associated with the sample cassette 28. In particular, the sample substrate 40 is wound upon the supply reel 42 with a portion of the substrate 40 exiting the supply reel 42. The portion of the sample substrate 40 exiting the supply reel 42 wraps partially around the direction roller 47 thereby directing the sample substrate 40 into the conduit 45. The sample substrate 40 is advanced through a restrictive passageway 58 defined in and extending through the length of the conduit 45. The restrictive passageway 58 has a cross-section and a length designed to provide for relatively low pneumatic conductance. The relatively low pneumatic conductance of the passageway 58 significantly restricts the flow of gas molecules through the passageway 58. Illustratively, the passageway 58 dimensions are about 1.3 centimeters by about 10 centimeters by about 0.1 centimeters. Further illustratively, the pneumatic conductance of the passageway 58 is about 0.23 liters per second.

The sample substrate 40 exits the conduit 45 and is curved around the staging surface 60 of the sample substrate stage 46. The staging surface 60 is configured with rounded edges or other similar features for maintaining an inward curvature on the flexible substrate 40 during advancement thereof across the stage 46. The sample substrate 40 is then advanced into a second restrictive passageway 66 defined in a second conduit 64. The sample substrate 40 then exits the second conduit 64 and winds around the take-up reel 44.

It should be appreciated that the supply reel 42 and the take-up reel 44 may be driven in similar rotational motion to advance the sample substrate 40, and hence the sample aliquots deposited upon the sample substrate 40, along the above-described path from the supply reel 42 to the take-up reel 44. During such advancement, the sample substrate 40 is maintained in an inward curvature orientation. Maintaining an inward curvature of the sample substrate 40 improves the ability to keep the sample aliquots deposited on the sample substrate 40 from being scraped off or otherwise removed during advancement along the above-described path. For example, the entrance and/or exits of the restrictive passageways 58, 66 may include a buffer 62, 68, respectively, to improve the curvature of the sample substrate 40 and thereby decrease the likelihood of the sample aliquot deposits being removed as the sample substrate 40 enters and/or exits the passageways 58, 66. Illustratively, the buffers 62, 68 have a triangular cross-section with an outwardly curving base 61, 67, respectively. The sample substrate 40 passes along the outwardly curving base 61, 67 of buffer 62, 68, respectively, thereby maintaining an inward curvature prior to entering or subsequent to exiting the passageways 58, 66.

As alluded to above, sample aliquots to be analyzed are deposited on the sample substrate 40 of the sample cassette 28 using methods commonly known to those of ordinary skill in the art. For example, the sample aliquots may be deposited in a row-column method along the length of the sample substrate 40. A large batch of sample aliquots may be deposited on the sample substrate due to its relatively long length. The sample cassette 28 is loaded onto the sample transport cart 32 located within the sample chamber 16, as shown in FIG. 3. The transport cart 32 includes a platform 72 upon which the sample cassette 28 is positioned. Alignment pins (not shown) extend from the platform 72 through alignment holes (not shown) in the platform 48 of the sample cassette 28. The cooperation of the alignment pins and the alignment holes improve the overall alignment of the sample cassette 28 and the transport cart 32.

A number of linear bearings 74 are coupled to the platform 72. The linear bearings are configured to slide along a plurality of guide rails 76. The cooperation of the platform 72, the linear bearings 74, and the guide rails 76 allows the platform 72, and hence the sample cassette 28, to be moved back and forth in a linear direction along the guide rails 76. A lead screw nut 78 is also secured to the platform 72. The lead screw nut 78 cooperates with a lead screw 80 to provide a driving force to the platform 72 thereby permitting the platform 72 to be driven in a linear direction along the guide rails 76. A motor 82 drives the lead screw 80 in a clockwise or counterclockwise direction depending on the linear direction desired. Other mechanisms for moving the platform 72 may be used, for example, hydraulic motors, linear actuators, belt driven motor systems, etcetera. Reel driving spindles (not shown) engage the supply reel 42 and take-up reel 44 of the sample cassette 28. Selective actuation of the driving spindles indexes or otherwise advances the sample substrate 40 through the above-described path of the sample cassette 28.

Illustratively, an optical reader 84 is also secured to the platform 72. The optical reader 84 is positioned so that the sample substrate 40 can be optically read as it progresses along the above-described path. Illustratively, the optical reader 84 includes a plurality of optical fibers. Scratch marks may be created on the sample substrate 40 by removing portions of the coating contained on one side of the sample substrate 40 thereby leaving a transparent area under each scratch mark. The scratch marks may be utilized for identification purposes, for example, to identify the particular sample or the position along the sample substrate 40. The optical reader 84 is employed to detect the transparent scratch marks as the sample substrate 40 passes in front of the optical reader. Accordingly, additional wires, electronics, and display devices may be used in conjunction with the optical reader 84 to facilitate the detecting and displaying of identification information. In the case of use of an uncoated sample substrate 40 (e.g., an uncoated tape), an opaque marking may be made on the substrate by use of, for example, a pen, stylus, inkjet cartridge. Such an opaque marking would be tracked or otherwise detected by use of the optical reader 84. In lieu of opaque markings or scratch marks, a sample tracking scheme may be implemented in which image recognition hardware/software and a camera (e.g., the MALDI mass spectrometer's existing camera) are utilized to detect the MALDI sample spots and position them at desired locations within the mass spectrometer 10.

The analysis of the composition of a MALDI sample by use of the MALDI mass spectrometer 10 generally begins with the depressurization of the ionization chamber 14 to a desired low pressure. To achieve such a low pressure in the ionization chamber 14, the gate door 26 is moved to the closed position (see FIG. 1) and the ionization chamber 14 is evacuated to the desired low pressure by the differential vacuum system 19. Illustratively, the ionization chamber 14 is evacuated to a pressure of about $10^{-7}$ torr. A pressure of about $10^{-7}$ torr is generally adequate for proper mass spectrometer operation. The relatively low pressure utilized in the ionization chamber 14 may take a relatively long time to achieve depending upon the moisture present in the ionization chamber 14. Illustratively, a pressure of about $10^{-7}$ torr is obtainable in around three to twenty-four hours utilizing vacuum pumps having a pumping rate of about 230 liters per second.

Sample aliquots to be analyzed are deposited on the sample substrate 40 of the sample cassette 28. The sample cassette 28 is then loaded on the transport cart 32. Once the sample cassette 28 is loaded on the sample transport cart 32, the sample chamber 16 is evacuated to a desired low pressure. The magnitude of the low pressure in the sample chamber 16 may be predetermined to account for considerations such as the length of time necessary to evacuate the sample chamber 16 and the amount of outgassing occurring from the sample substrate 40. The slow release of large amounts of gas that may be trapped between the layers of the wound sample substrate 40 may render the obtainment of very low pressures in the sample chamber 16 difficult in a relatively short time period. However, a pressure of about $10^{-5}$ torr is obtainable in the sample chamber 16 within a relatively short time period, illustratively about twenty minutes, utilizing vacuum pumps having a pumping rate of about 230 liters per second.

Figure 4:
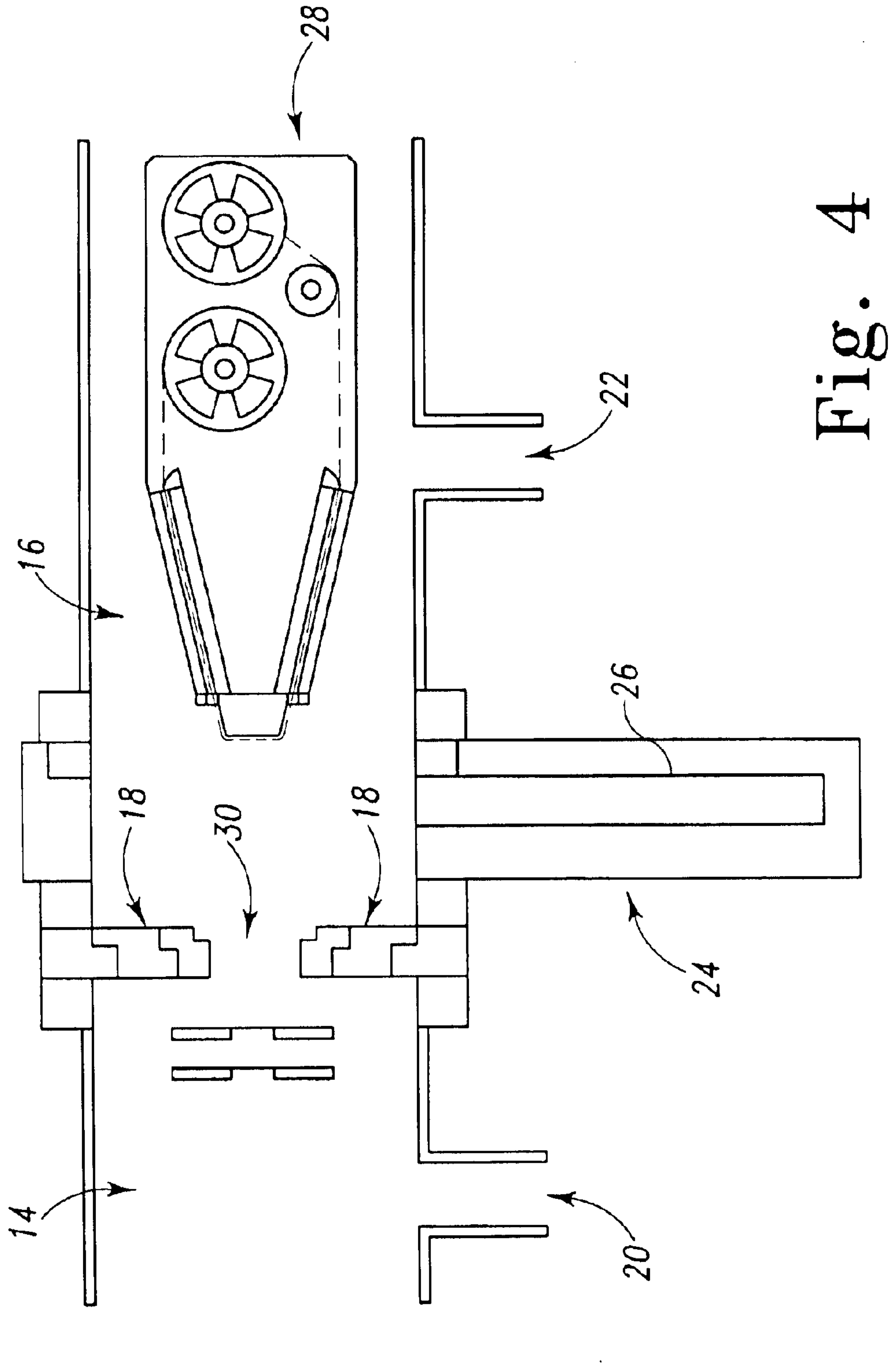
FIG. 4 is a view similar to FIG. 1, but showing the gate valve positioned in its open position.

Once the sample chamber 16 has been evacuated to a pressure of about $10^{-5}$ torr, the sample cassette 28 is moved forward along a linear path by transport 32 to a position adjacent the gate door 26. The gate door 26 is then moved to an open position as shown in FIG. 4. By coordinating the movements of the sample cassette 28, the transport cart 32, and the gate door 26, the amount of time the ionization chamber 14 is exposed to the relatively higher pressure in the sample chamber 16 may be reduced.

Figure 5:
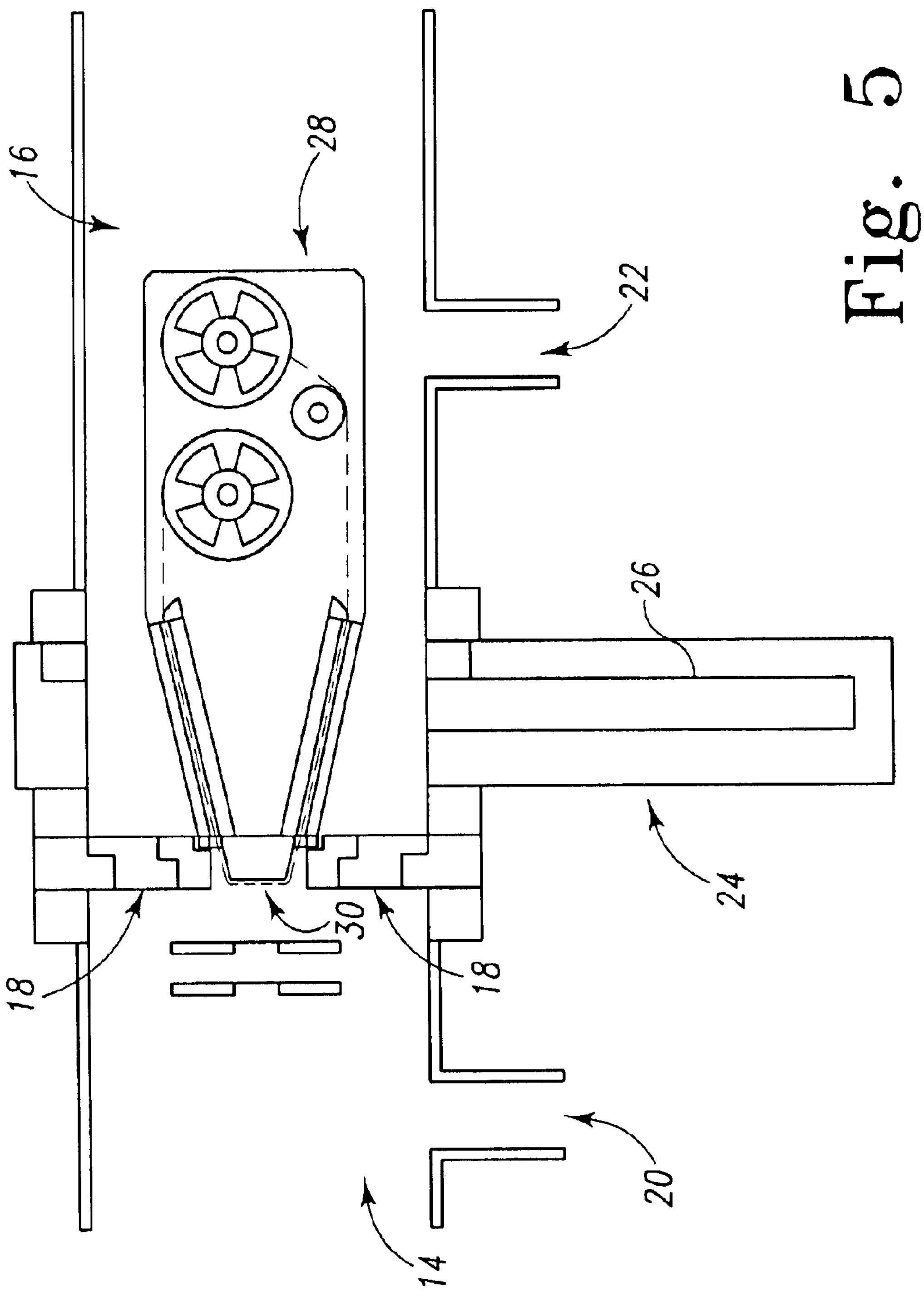
FIG. 5 is a view similar to FIG. 4, but showing the transport cart positioned to allow for the sampling of aliquots of the sample cassette.

Once the gate door 26 is opened, the sample cassette 28 is then moved forward along a linear path by the transport cart 32 in a direction toward the interface wall 18. It should be appreciated that the opening of the gate door 26 and the forward movement of sample cassette 28 may occur somewhat in unison thereby resulting in the sample cassette 28 reaching the interface wall 18 at approximately the same time as the gate door 26 reaches the fully opened position. The sample cassette 28 is moved forward until the sample cassette 28 confronts or abuts the interface wall 18, as shown in FIG. 5. When the sample cassette 28 is positioned in such a position, the stage 46 extends through the cassette-docking aperture 30 and into the ionization chamber 14. The restrictive passageways 58, 66 allow the sample substrate 40 to propagate from the sample chamber 16 into the ionization chamber 14 and across the stage 46 thereby allowing for the analysis of the sample aliquots in the ionization chamber 14. As sample aliquots are analyzed, new sample aliquots are moved into the ionization chamber 14 by indexing or otherwise advancing the sample substrate 40 of the sample cassette 28.

The cooperation between the sample cassette 28 and the interface wall 18 creates a substantially complete pneumatic seal. However, the restrictive passageways 58, 66 allow for a relatively limited amount of pneumatic communication between the ionization chamber 14 and the sample chamber 16. In particular, the illustrative dimensions of the passageways 58, 66 provide for a relatively low fluid conductance. Illustratively, the relatively low fluid conductance of 0.23 liters per second allows the sample chamber 16 to be held at an illustrative pressure of about $10^{-5}$ torr while the ionization chamber 14 is held at lower illustrative pressure of about $10^{-7}$ torr.

Figure 6:
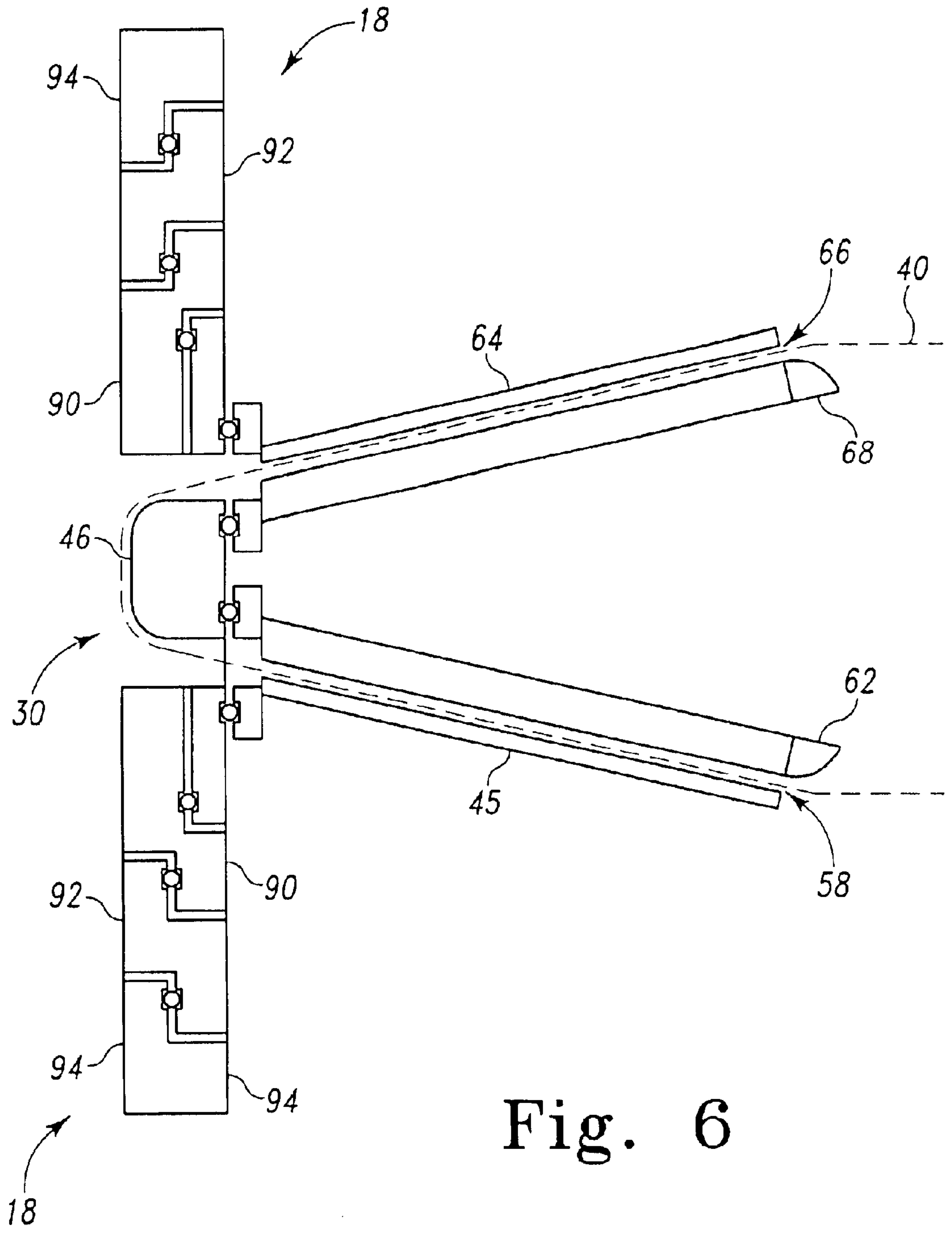
FIG. 6 is an enlarged view similar to FIG. 4 showing the sample stage extending through the interface wall.

During ionization, a high electrical potential of about 30,000 volts is applied to the sample aliquots that are being analyzed. As such, when the sample cassette 28 is positioned in contact with the interface wall 18, the stage 46 is in electrical contact with an electrically conductive ring 90 of the interface wall 18. The electrically conductive ring 90 defines the aperture 30 of the interface wall 18, as shown in FIG. 6. Illustratively, the electrically conductive ring 90 is maintained at a potential of about 30,000 volts during operation of the MALDI mass spectrometer 10. The electrically conductive ring 90 is insulated from the outer flange 94 of the interface wall 18 by a nonconductive ring 92. The nonconductive ring 92 prevents arcing between the conductive ring 90 and the outer flange 94 (and hence the housing of the MALDI mass spectrometer 10).

In cases where the sample substrate 40 includes a conductive coating, electrical arcing may occur when the sample substrate 40 is in close proximity to conductive surfaces. To reduce the possibility of such arcing, portions of the sample cassette 28 may be constructed from insulating materials. For example, the conduits 45 may be constructed from insulating materials or alternatively may be insulated from the sample substrate stage 46 by an insulating material.

Once a sample aliquot has been ionized and analyzed, the sample substrate 40 is indexed or otherwise advanced along the above-described path by the rotation of the reel driving spindles. The ionization, analysis, and advancement of the sample substrate 40 is repeated until all the sample aliquots deposited on the sample substrate 40 have been analyzed. At this time, the sample cassette 28 is moved in a linear direction away from the interface wall 18 by the transport cart 32, the gate valve 24 is closed, and the sample chamber 16 is pressurized. The sample cassette 28 may then be unloaded from the transport cart 32, removed from the sample chamber 16, and stored in an appropriate facility for later inspection.

Figure 7:
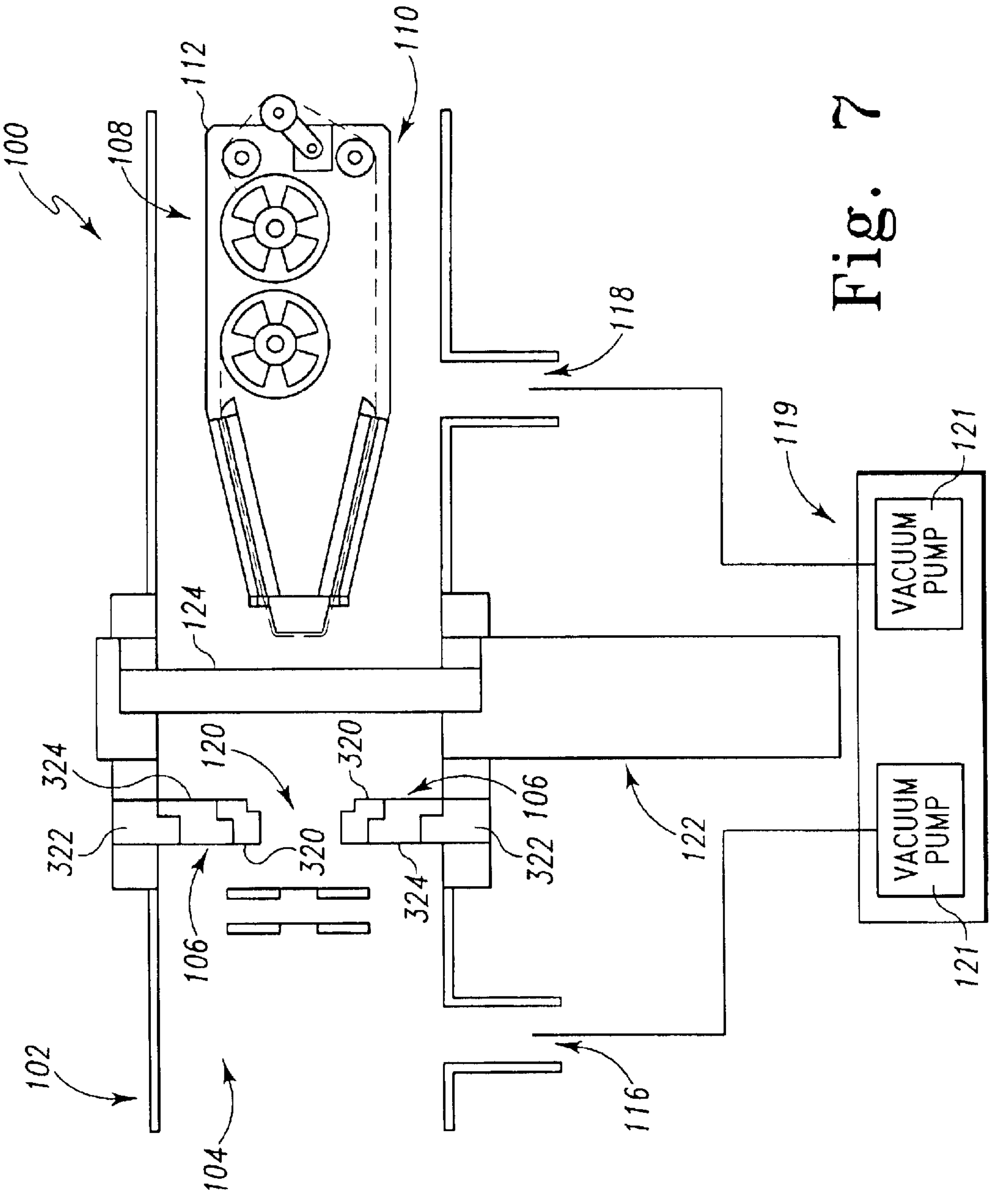
FIG. 7 is a diagrammatic view of a MALDI mass spectrometer.

Referring now to FIGS. 7–29, there is shown a more specific illustrative embodiment of a MALDI mass spectrometer (hereinafter referred to with reference numeral 100). As shown in FIG. 7, the MALDI mass spectrometer 100 includes a time-of-flight (TOF) mass spectrometer 102 having an ionization chamber 104 and a sample staging assembly 103 having a sample chamber 108. An interface wall 106 is positioned between the ionization chamber 104 and the sample chamber 108. A sample cassette transport cart 110 is positioned in the sample chamber 108 and has a sample cassette 112 removably secured thereto.

Figure 9:
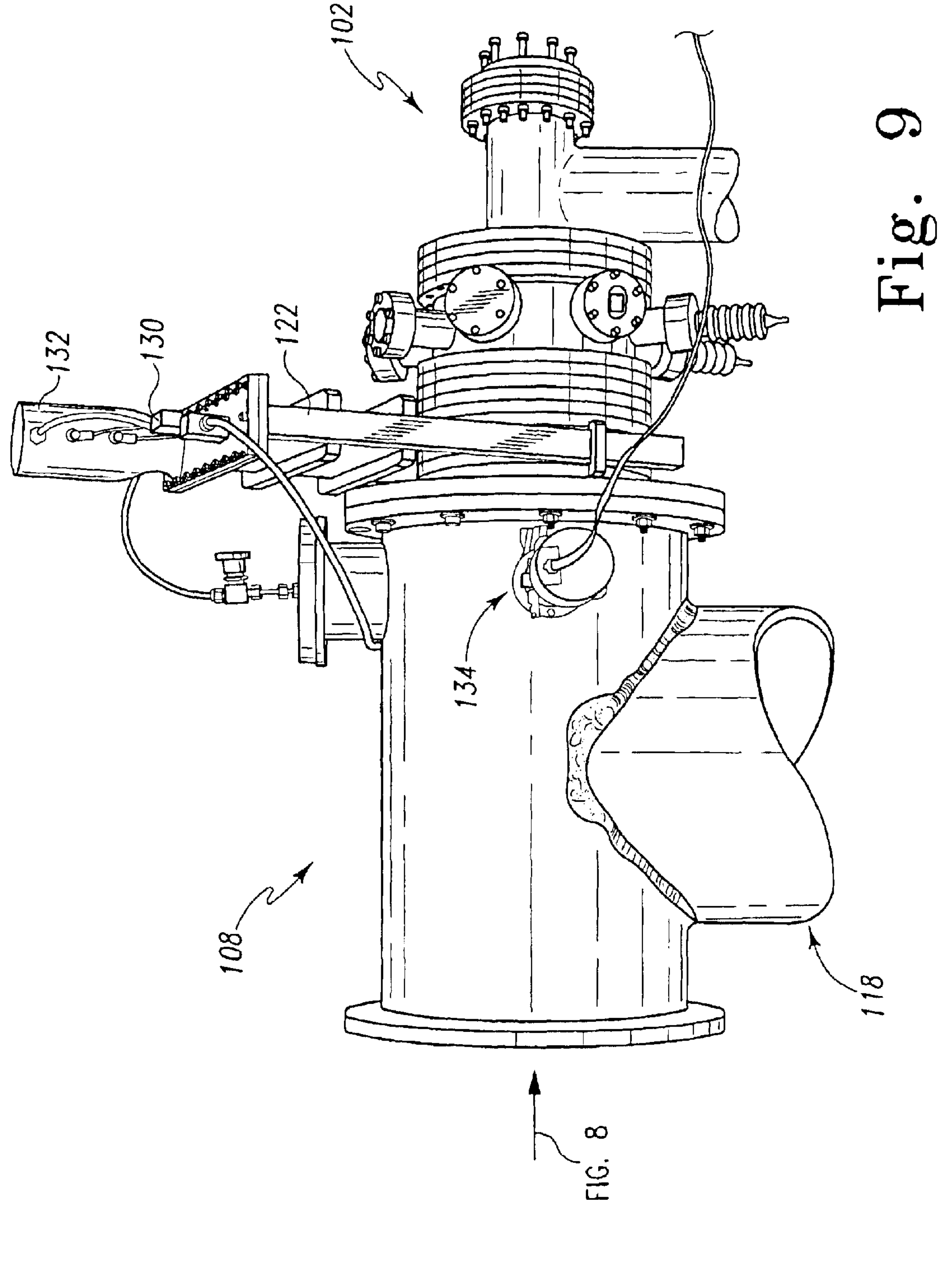
FIG. 9 is a fragmentary side perspective view of the MALDI mass spectrometer of FIG. 7.
Figure 10:
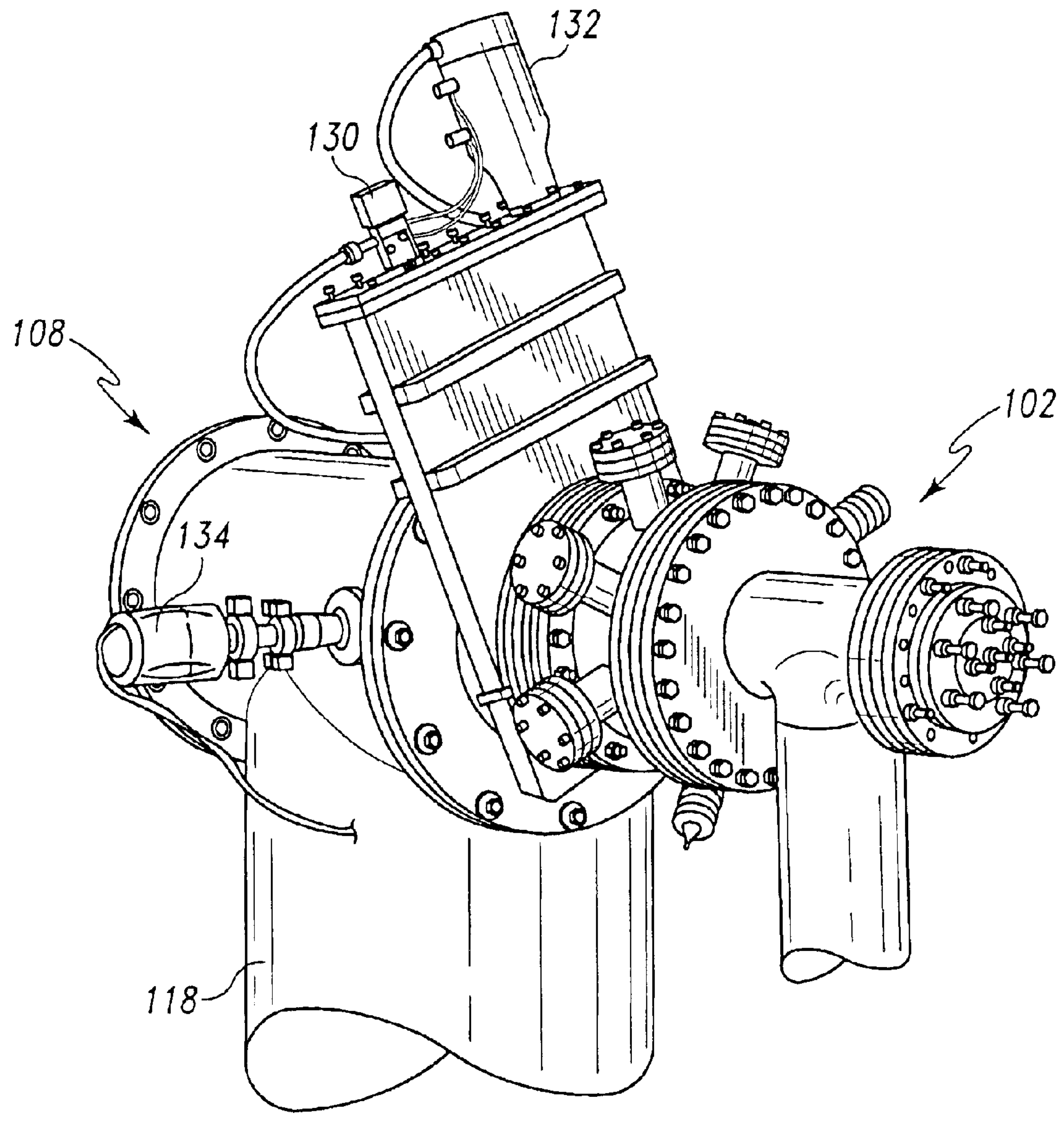
FIG. 10 is a fragmentary front perspective view of the MALDI mass spectrometer of FIG. 7.

Each of the chambers 104, 108 has a vacuum port 116, 118, respectively, associated therewith. A cassette-docking aperture 120 defined in the interface wall 106 fluidly couples the chambers 104, 108 to one another. The ionization chamber 104 may be selectively separated and sealed from the sample chamber 108 by a gate valve 122. In particular, the gate valve has a movable gate door 124 which is positionable between a closed position in which the ionization chamber 104 is fluidly (i.e., pneumatically) sealed from chamber 108 (see FIG. 7) and an open position in which fluid (i.e., pneumatic) communication is allowed between the chambers 104, 108 (see FIG. 28). Illustratively, movement of the gate door 124 is controlled by a pneumatic actuator 132, as shown in FIGS. 9 and 10. An air valve 130 meters a quantity of compressed air to the pneumatic actuator 132 depending upon the desired motion of the gate door 124. The air valve 130 is controlled electronically by a control circuit (not shown). Illustratively, the gate door 124 moves in a lateral direction to separate and seal each of the chambers 104, 108 from one another. However, gate valves having other mechanisms for separating and sealing the chambers 104, 108 may be used. For example an iris-like sealing door or a combination of smaller doors which cooperate together to seal the chambers 104, 108 may be used.

Figure 29:
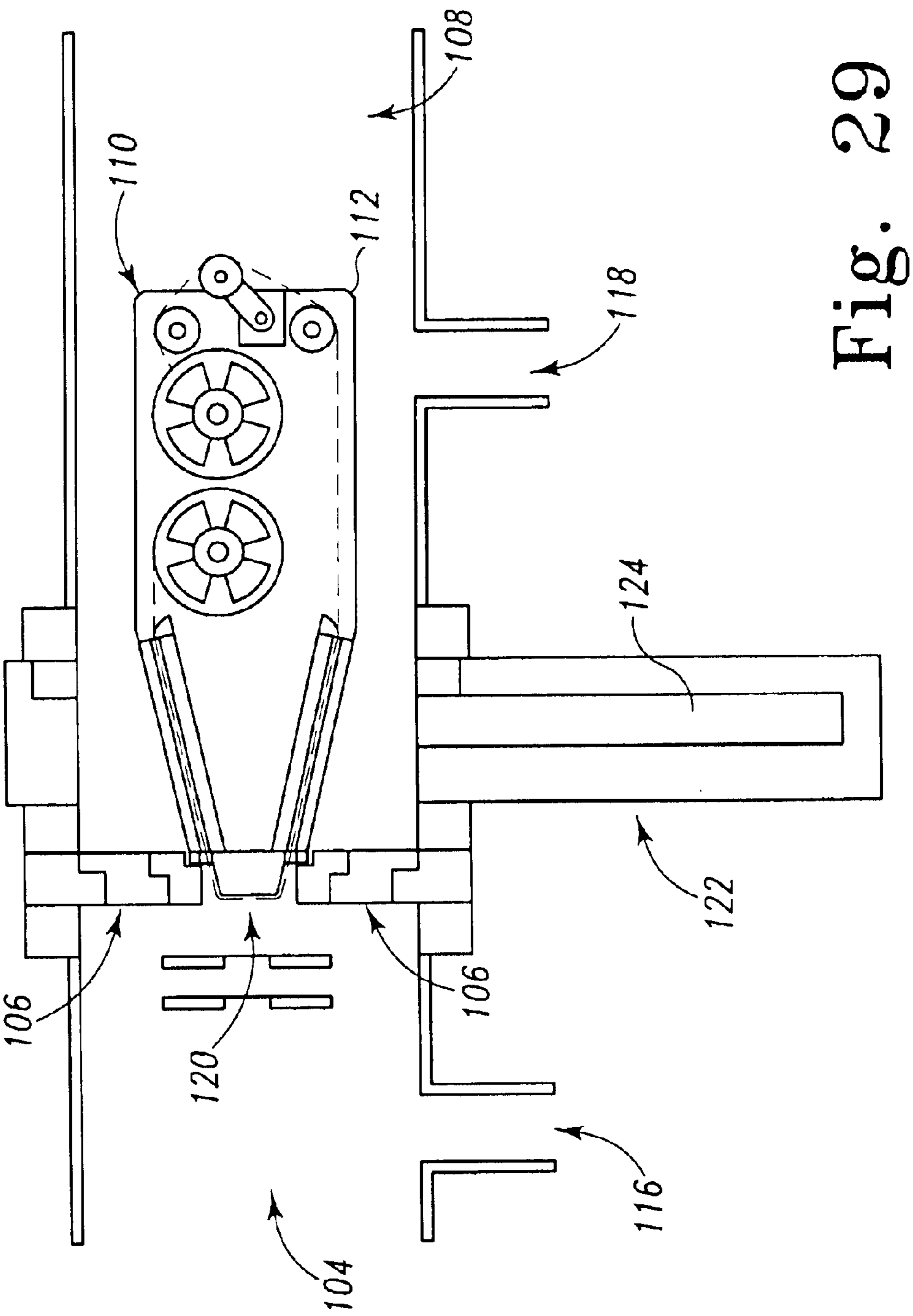
FIG. 29 is a diagrammatic view similar to FIG. 28, but showing the transport cart positioned to allow for the sampling of aliquots of the sample cassette.

The interface wall 106 includes an outer flange 322, a nonconductive ring 324, and an electrically conductive ring 320. The electrically conductive ring 320 defines the aperture 120 of the interface wall 106, as shown in FIG. 29. The electrically conductive ring 320 is insulated from the outer flange 322 of the interface wall 106 by the nonconductive ring 324.

Figure 8:
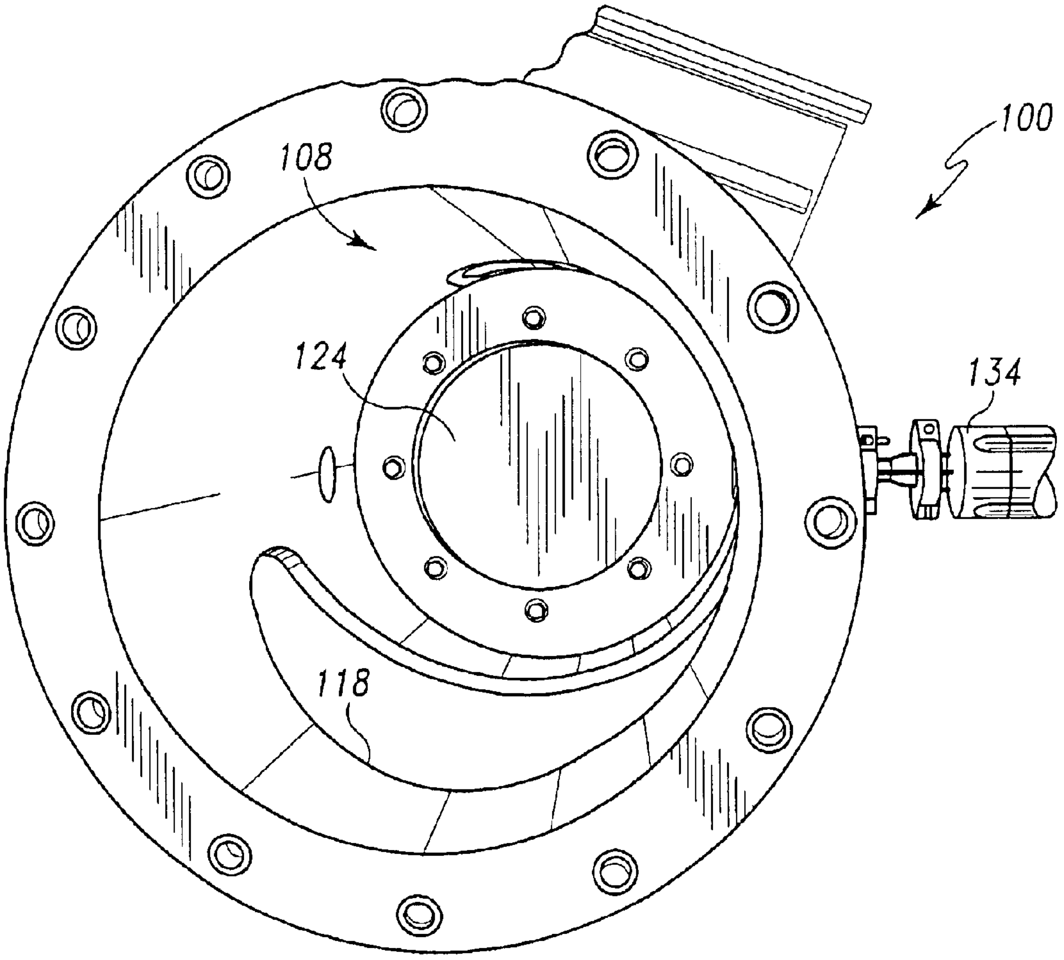
FIG. 8 is a fragmentary elevational view of the MALDI mass spectrometer of FIG. 7, as viewed in the direction of the arrow labeled "FIG. 8" in FIG. 9, note that the transport cart has been removed from FIG. 8 for clarity of description.

The MALDI mass spectrometer 100 further includes a differential vacuum system 119 fluidly coupled to chambers 104, 108 via vacuum ports 116, 118, respectively. The differential vacuum system 119 facilitates the reduction and maintenance of the low pressure in the ionization chamber 104 and the reduction and maintenance of the low pressure in the sample chamber 108. In an illustrative example, the differential vacuum system 119 is operated to maintain the ionization chamber at a lower pressure than the sample chamber 108. Illustratively, the differential vacuum system 119 includes two independent and separate vacuum sources such as vacuum pumps 121 each of which is fluidly coupled to one of the vacuum ports 116, 118. Further illustratively, the vacuum system includes two turbo molecular Leybold TW300 pumps having a pumping rate of about 230 liters per second. A vacuum gauge 134 is coupled to the housing of the sample chamber 108 and measures the quality of vacuum within the sample chamber 108, as shown in FIGS. 8–10.

Figure 11:
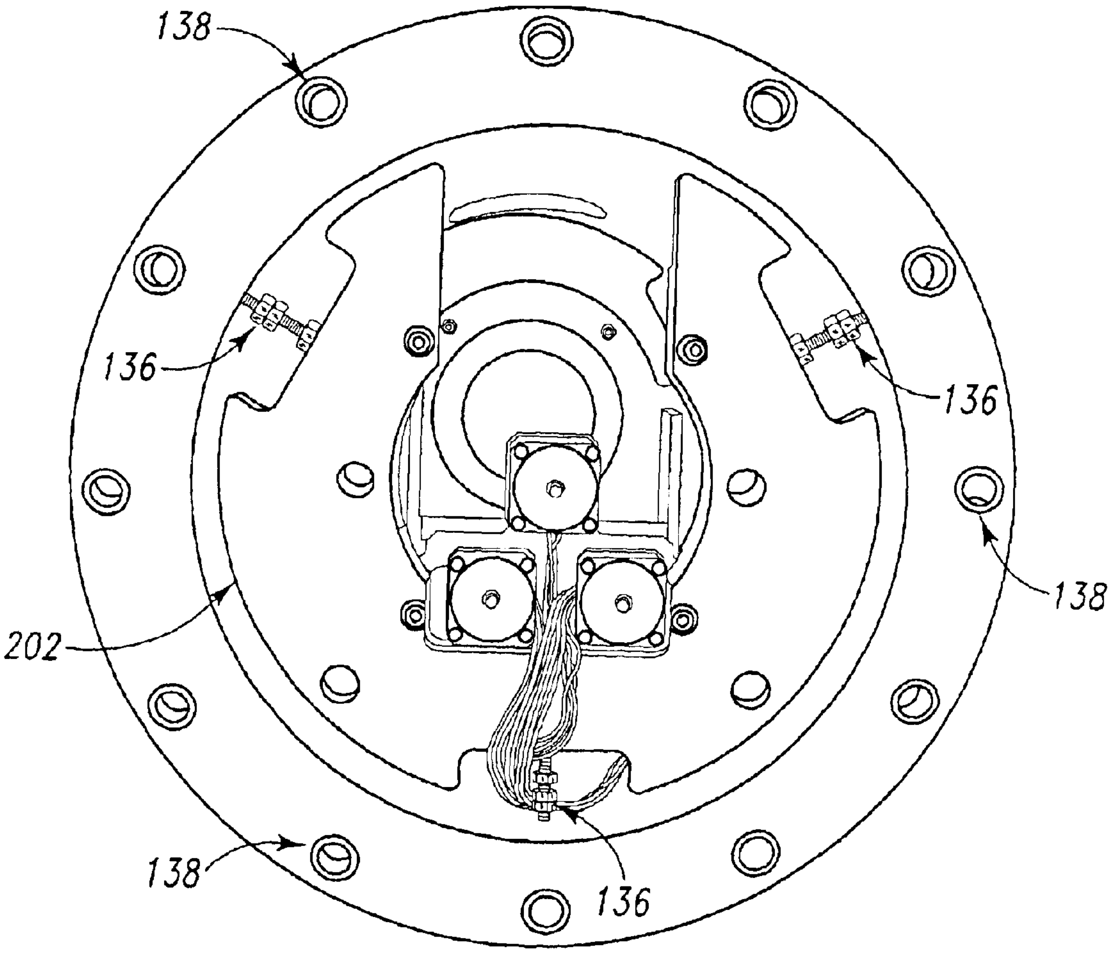
FIG. 11 is a view similar to FIG. 8, but showing the transport cart positioned in the sample chamber.

As alluded to above, the transport cart 110 is positioned in the sample chamber 108. Illustratively, the transport cart 110 is held in a substantially central position within the cavity 124, as shown in FIG. 11, by a plurality of spiders 136. The spiders 136 are embodied as threaded screw and nuts assemblies which engage the inner surfaces of the housing of the sample chamber 108. However, other methods of centrally locating the transport cart 110 within the sample chamber may include spacers displacing the cart from the wall of the chamber 108, a number of hook members coupled to the transport cart 110 and the housing of the sample chamber 108, along with other mechanisms known to those of ordinary skill in the art. Illustratively, the transport cart is positioned within the sample chamber 108 by unbolting and removing a rear plate (not shown) from the housing of the sample chamber 108, inserting and securing the transport cart 110 by use of the spiders 136, and rebolting the rear plate to the sample chamber 108 utilizing a plurality of bolts threadingly positioned in a corresponding number of bolt holes 138.

Other methods for accessing the transport cart 110 within the sample chamber 108 may include, for example, the use of a side, top, or bottom access panel formed in the housing of the sample chamber 108 or through a frontal opening (not shown) of sample chamber 108 accessible prior to the coupling of the sample chamber 108 to the ionization chamber 104.

The transport cart 110 is configured to receive the sample cassette 112. The sample cassette 112, shown in FIG. 12, includes a platform 140 configured to support a supply reel 146 and a take-up reel 148. Illustratively, the platform 140 has a tapered configuration having a first side edge 150, a top edge 152, a bottom edge 154, a first inwardly sloping edge 156, a second inwardly sloping edge 158, and a second side edge 160. The first side edge 150 includes a notch 162 and the bottom edge 154 includes a notch 164.

A plurality of reel securing devices 142 are coupled to a top surface 141 of the platform 140 and are operable to secure the reels 146, 148 to the platform 140. Illustratively, the reel securing devices 142 include a tab 144. Each of the reel securing devices 142 may be rotated between an engaged position in which the tab 144 is positioned above the reels 146, 148 thereby securing the reels 146, 148 to the platform 140 and a disengaged position in which the protrusions 144 are not positioned over the reels 146, 148 thereby allowing the loading and unloading of the reels 146, 148 from the sample cassette 112. The reel securing devices 142 are each illustratively shown in their respective engaged positions in FIG. 12.

A sample substrate 166 is wound upon the supply reel 146 with a portion of the substrate 166 exiting the supply reel 146. Illustratively, the sample substrate 166 is a tape-like medium, for example polymer tape, upon which sample aliquots may be disposed. The sample substrate 166 may include an opaque coating on one of its surfaces. The portion of the sample substrate 166 exiting the supply reel 146 is indexed or otherwise advanced along a path defined by the components of the sample cassette 28. Illustratively, the portion of the sample substrate 166 exiting the supply reel 146 wraps partially around a first direction roller 168 thereby directing the sample substrate 166 onto a second direction roller 170. The sample substrate 166 wraps partially around the direction roller 170 thereby directing the sample substrate 166 into a conduit 172 secured to the top surface 141 of the platform 140. The sample substrate 166 is advanced through a restrictive passageway 174 defined in and extending the length of the conduit 172. The restrictive passageway 174 has a cross-section and a length designed to provide for relatively low pneumatic conductance. The relatively low pneumatic conductance of the passageway 174 substantially restricts the flow of gas molecules through the passageway 174. Illustratively, the dimensions of the passageway 174 are about 1.3 centimeters by about 10 centimeters by about 0.1 centimeters. Further illustratively, the pneumatic conductance of the passageway 174 is about 0.23 liters per second.

Figure 13:
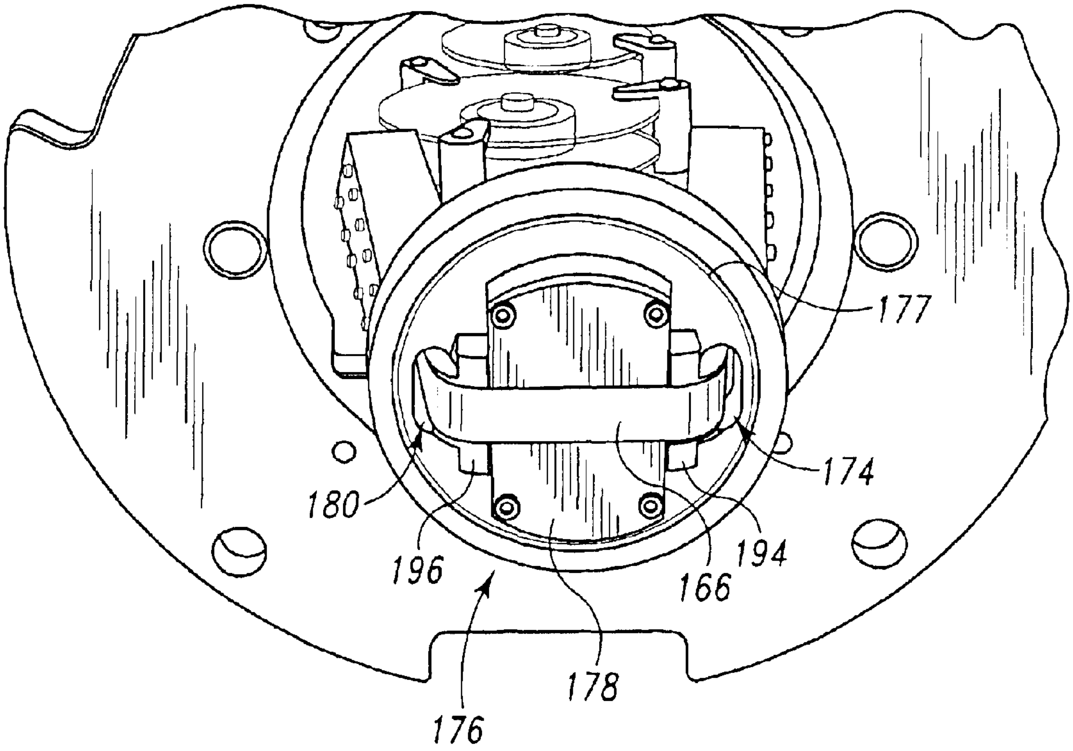
FIG. 13 is a fragmentary front perspective view of the sample cassette secured to the transport cart of FIG. 12.

The sample substrate 166 exits the restrictive passageway 174 of conduit 172 and curves around a staging surface 178 of a sample substrate stage 176, as shown in FIG. 13. The staging surface 178 of the stage 176 is relatively flat thereby maintaining the sample substrate 166 in a relatively flat position, which is appropriate for proper MALDI analysis. The sample substrate stage 176 includes a seal ring 177 disposed around the staging surface 178 and passageways 174, 180. The seal ring 177 is formed from a rubber composite although other materials may be used. The seal ring 177 allows for a substantially complete pneumatic seal to be created when the sample cassette 112 is urged into contact with the interface wall 106. It is contemplated that in certain design configurations adequate sealing may be achieved without the use of a seal ring 177. The sample substrate stage 176 is structurally reinforced by a support member 192 which is secured to the platform 140.

Figure 12:
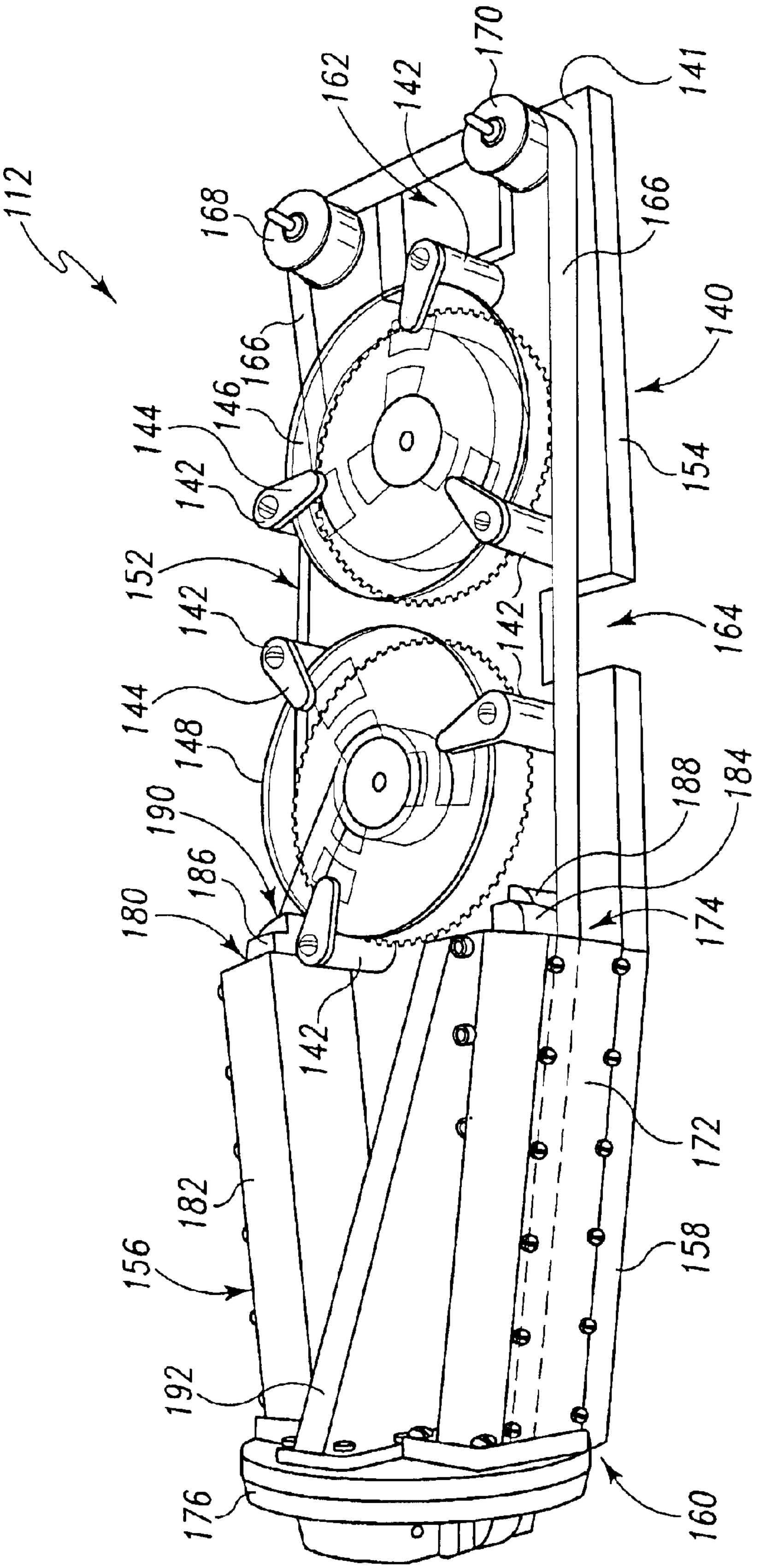
FIG. 12 is a perspective view of the sample cassette of the MALDI mass spectrometer of FIG. 7.

Illustratively, as shown in FIG. 12, subsequent to advancement along the sample stage 176, the sample substrate 166 is advanced into a restrictive passageway 180 of a conduit 182. The passageway 180 and the conduit 182 are substantially similar to the passageway 174 and the conduit 172, respectively. The sample substrate 166 exits the passageway 180 of the conduit 182 and enters the take-up reel 148. Although two conduits are shown in the illustrative embodiment, it should be appreciated that a single conduit having one or more restrictive passageways may be used. Additionally, in some embodiments, a plurality of conduits having a plurality of restrictive passageways may be used to facilitate the utilization of one or more sample substrates.

As the sample substrate 166 journeys through the above-described path, the sample substrate 166 maintains an inward curvature. Maintaining an inward curvature of the sample substrate 166 improves the ability to keep the sample aliquots deposited on the sample substrate 166 from being scraped off or otherwise removed during its advancement along the above-described path. For example, the entrance of restrictive passageway 172 and the exit of restrictive passageway 182 may include a buffer 184, 186, respectively, to improve the inward curvature of the sample substrate 166 and thereby decrease the likelihood of the sample aliquot deposits being removed as the sample substrate 166 enters and exits the passageways 172, 182. Illustratively, the buffers 184, 186 have a triangular cross-section with an outwardly curving base 188, 190, respectively. The sample substrate 166 passes along the outwardly curving bases 188, 190 of buffers 184, 186, respectively, thereby maintaining an inward curvature prior to entering or subsequent to exiting the passageways 172, 182. Similarly, buffers 194, 196 are coupled to the stage 176 and improve the inward curvature of the substrate 166 as it exits the restrictive passageway 174 and enters the restrictive passageway 180. Additionally, a predetermined length of the sample substrate 166 may be devoid of sample aliquots thereby lowering the risk of inadvertently removing sample aliquots during the initial setup of the sample substrate 166 between the reels 146, 148 of the sample cassette 112.

The platform 140 includes two reel access holes (not shown) under the general area occupied by the reels 146, 148. The reel access holes allow spindles, gears, or other rotational devices to couple with the reels 146, 148 and cooperate to drive the reels 146, 148 in a clockwise or counterclockwise rotational direction. It should be appreciated that the supply reel 146 and the take-up reel 148 may be driven in similar rotational motion to move the sample substrate 166, and hence the sample aliquots deposited upon the sample substrate 166, along the above-described path from the supply reel 146 to the take-up reel 148.

Figure 14:
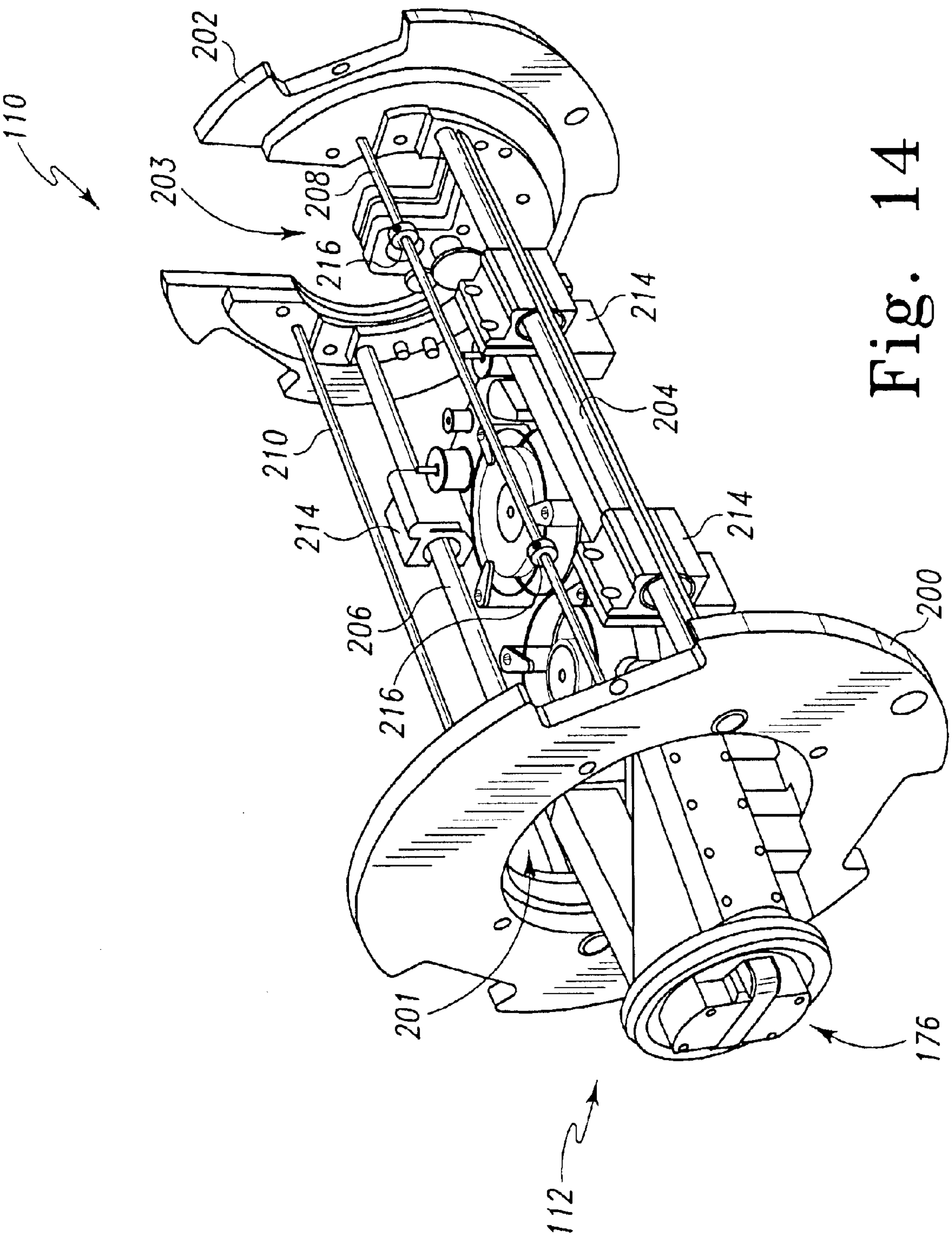
FIG. 14 is a perspective view of the transport cart with the sample cassette of FIG. 12 loaded thereon.
Figure 15:
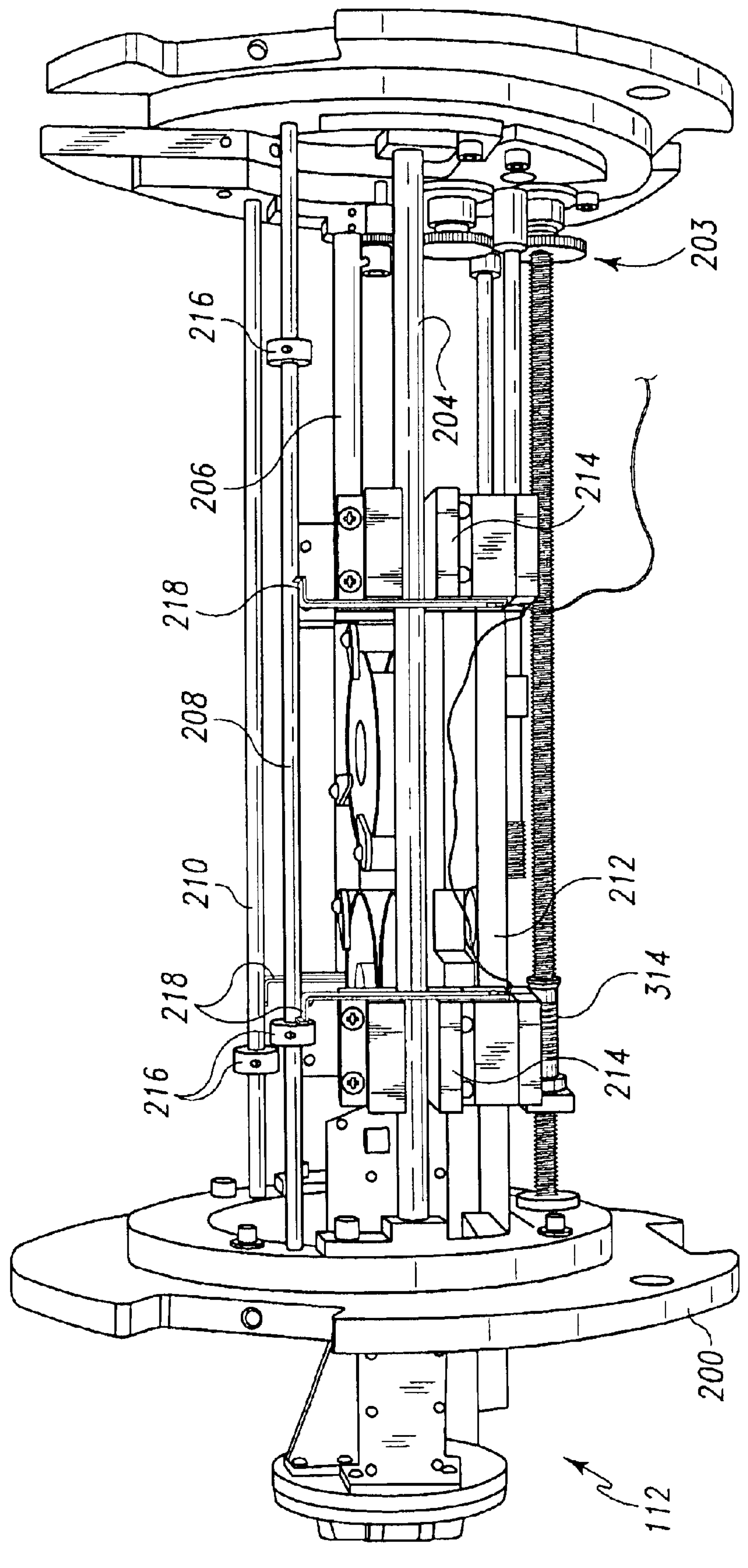
FIG. 15 is a side perspective view of the transport cart and sample cassette of FIG. 14.
Figure 16:
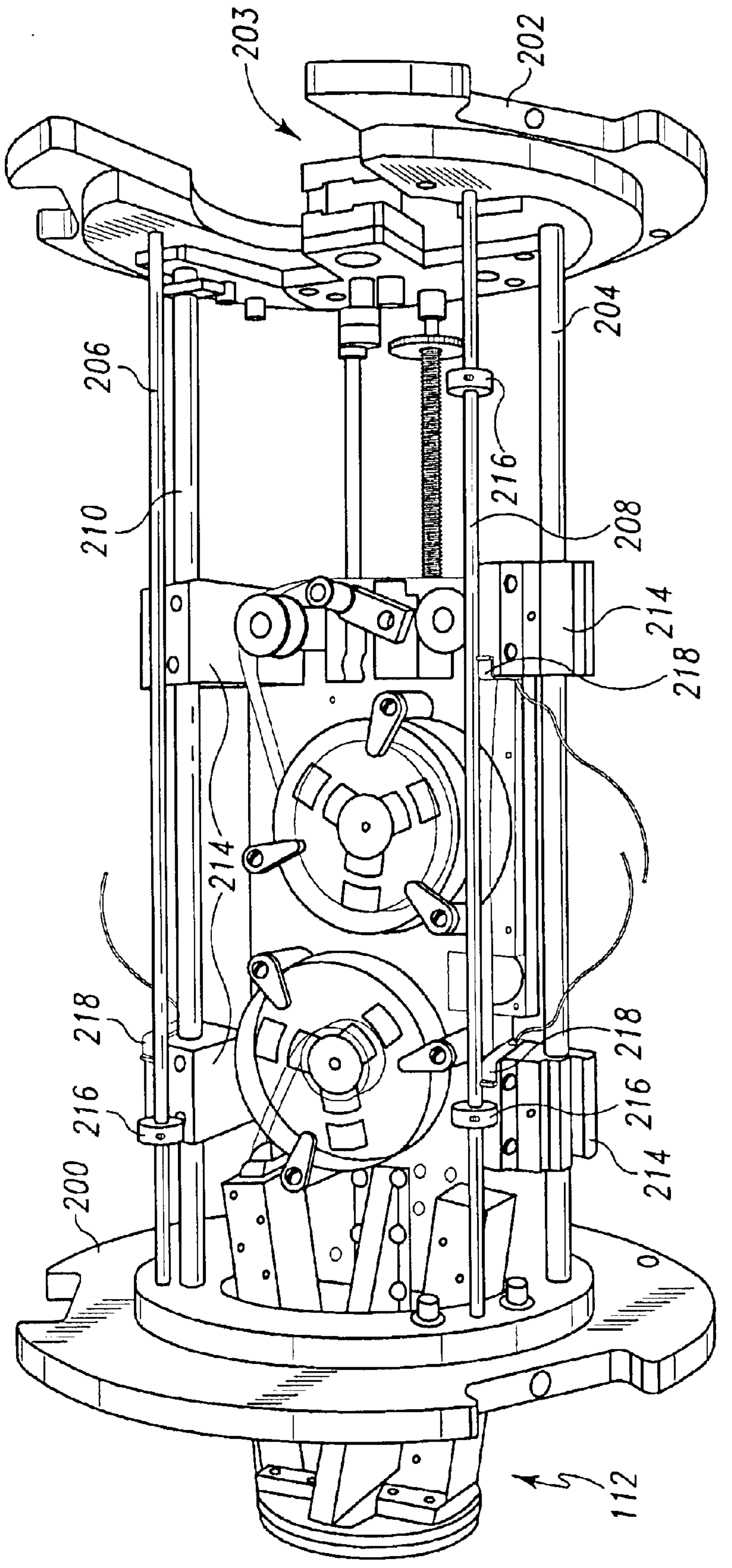
FIG. 16 is a top perspective view of the transport cart and sample cassette of FIG. 14.

As shown in FIGS. 14–16, the transport cart 110 is configured to receive the sample cassette 112. The transport cart 32 includes a front flange 200 and a rear flange 202. The front flange 200 includes an aperture 201, through which the sample substrate stage 176 of the sample cassette 112 extends when the sample cassette 112 is positioned to allow for the sampling of the aliquots on the sample substrate 166 (i.e., the position shown in FIG. 14). A motor and gear assembly 203 is coupled to the rear flange 202, as shown in FIG. 14.

The flanges 200, 202 utilize a number of the spiders 136 to support the transport cart 110 inside the sample chamber 108 as shown in FIG. 11. The flanges 200, 202 are coupled together by a pair of parallel guide rails 204, 206 which extend from the rear flange 202 to the front flange 200. The guide rails 204, 206 are approximately vertically centered, but offset from the horizontal center of the flanges 200, 202 as shown in FIGS. 14 and 16. A pair of collar rails 208, 210 also extend between the flanges 200, 202. The collar rails 208, 210 are approximately parallel to and vertically above the guide rails 204, 206.

The transport cart 110 also includes a platform 212. A plurality of linear bearing couplings 214 are secured to the platform 212. The bearing couplings 214 slide along the guide rails 204, 206. Illustratively, as shown in FIG. 14, two couplings 214 are coupled to guide rail 204 and two couplings 214 are coupled to guide rail 206. As such, the couplings 214 support the platform 212. The cooperation of the platform 212, the couplings 214, and the guide rails 204, 206 allows for the platform 212, and hence the sample cassette 112, to be moved back and forth in a linear direction toward and away from the front flange 200 along the guide rails 204, 206.

A number of position collars 216 are coupled to the collar rails 208, 210. Illustratively, the position collars 216 are circular couplings capable of being fixed in position on one of the collar rails 208, 210. The collars 216 are used to detect the position of the platform 212. In particular, limit switches 218 are coupled to one side of the couplings 216, as shown in FIG. 15. As the platform 212 is moved, one or more of the limit switches 218 come in contact with one or more position collars 216. When a limit switch 218 comes into contact with a position collar 216, the limit switch 218 produces a signal on a wire (not shown) coupled to the limit switch 218. The wire may be coupled to a processing unit (not shown). According to which limit switch 218 is producing a signal, the processing unit may determine the position of the platform 212 and hence the position of the sample cassette 112.

Figure 17:
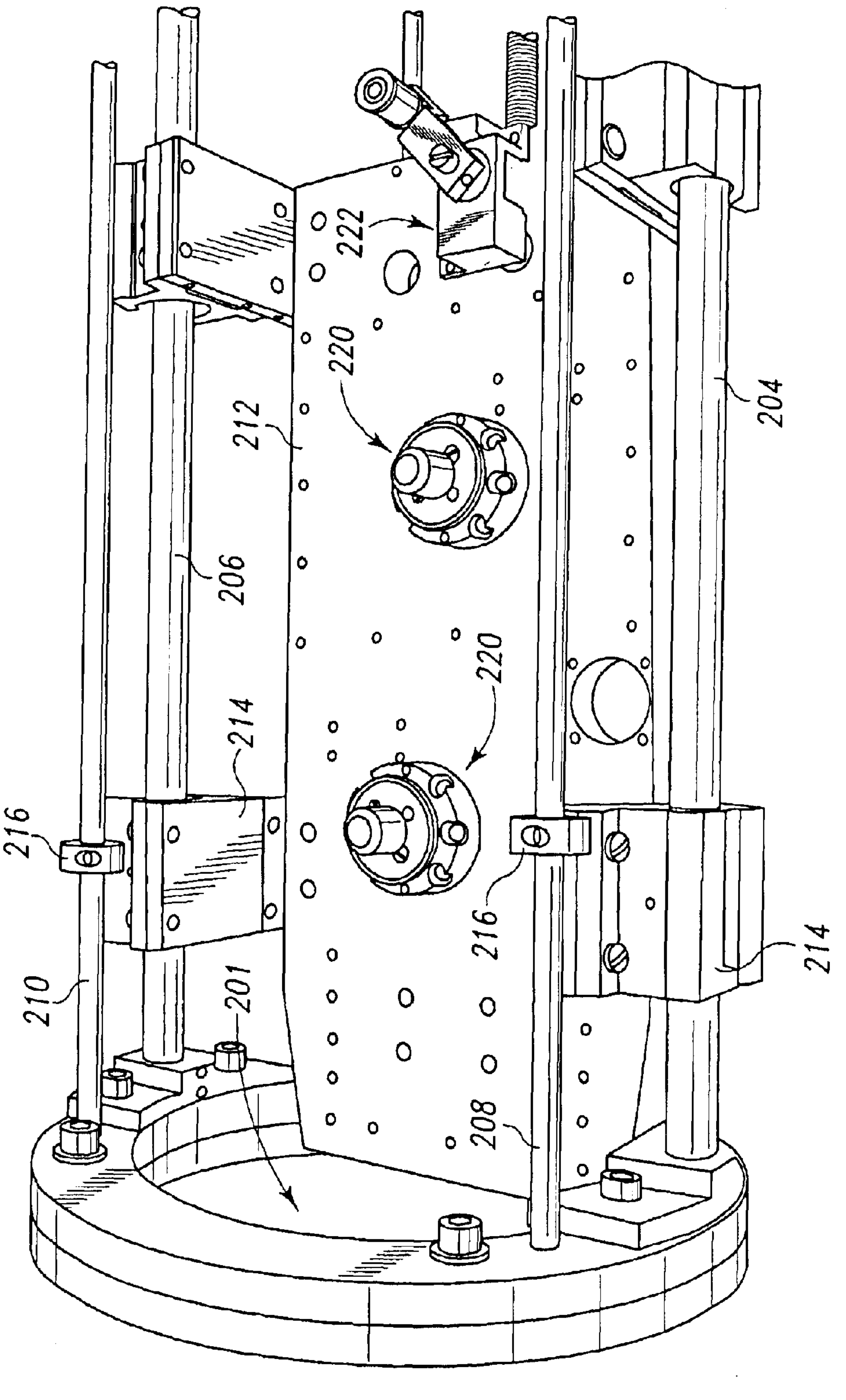
FIG. 17 is a fragmentary top perspective view of the transport cart of FIG. 14 with the sample cassette removed therefrom.

The platform 212 has two reel driving spindles 220 and a tape tensioner 222 coupled thereto, as shown in FIG. 17. In the illustrative embodiment, the two reel driving spindles 220 are motorized. However, in some embodiments, only one of the spindles 220 may be motorized. When the sample cassette 112 is loaded onto the platform 212 of the transport cart 110, the reel spindles 220 engage the supply reel 146 and the take-up reel 148 through the reel access holes (not shown) of the platform 140 of the sample cassette 112. The reel spindles 220 are driven by the motor and gear assembly 203 (see FIG. 15) to rotate the reels 146, 148 in the desired rotational direction.

Figure 18:
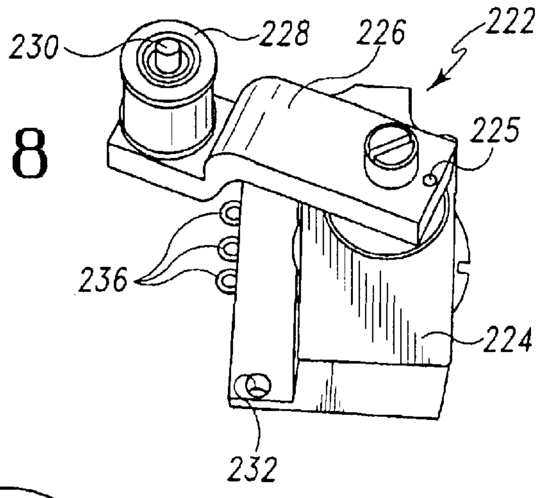
FIG. 18 is a perspective view of the tape tensioner of the transport cart.
Figure 19:
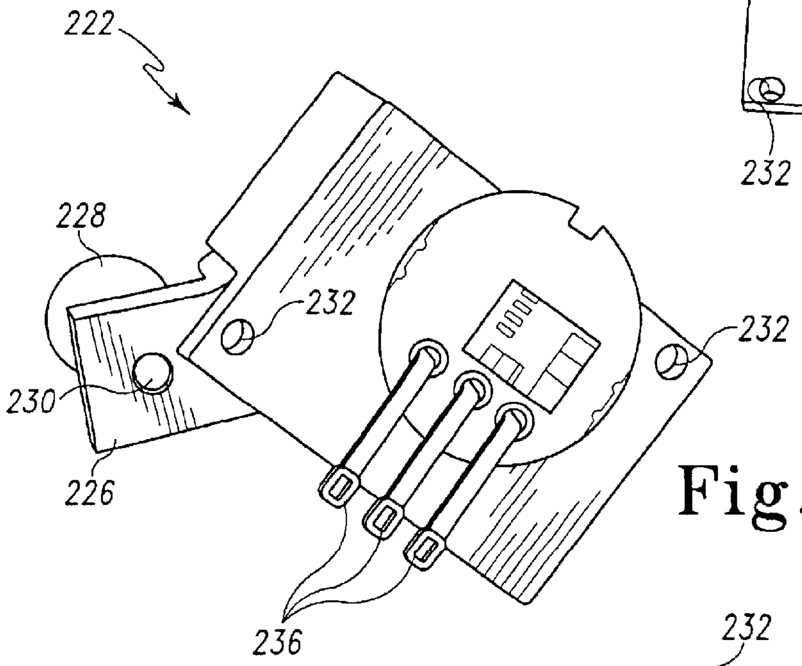
FIG. 19 is a bottom perspective view of the tape tensioner of FIG. 18.
Figure 20:
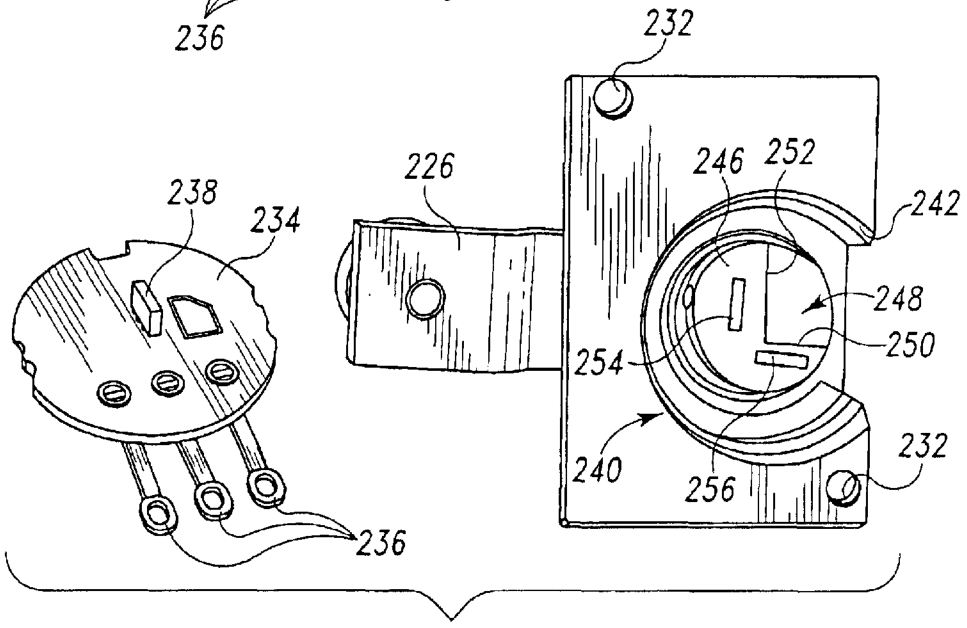
FIG. 20 is an exploded perspective view of the tape tensioner of FIG. 18.

The tape tensioner 222 may be used to sense or otherwise detect the tension of the sample substrate 166 and maintain the inward curvature of the sample substrate 166. Illustratively, the tape tensioner 222 includes a body 224, a non-conductive arm 226 coupled to the body 224, and a tension roller 228 coupled to the arm 226, as shown in FIG. 18. The arm 226 is movable relative to the body 224 in angular direction. The roller 228 rotates around a pin 230 coupled to the arm 226. The body 224 has a printed circuit board (hereinafter sometimes PCB) 234 secured thereto, as shown in FIG. 19. The PCB 234 has a plurality of terminals 236 associated therewith. As shown in FIG. 20, the PCB 234 has a Hall Effect sensor 238 secured thereto. The Hall Effect sensor 238 may be embodied as a model HRS 100 sensor which is commercially available from Clarostat Sensors and Controls, Incorporated of El Paso, Tex., and which is modified to function in a vacuum environment. The terminals 236 are electrically coupled to the sensor 238. The PCB 234 is inserted in an aperture 240 of the body 224 of the tape tensioner 222 and rests upon a lip 242. A magnet housing 246 is coupled to the arm 226 and extends into the aperture 240. The magnet housing 246 is substantially cylindrical with a portion of the cylinder removed thereby creating a void 248 in the magnet housing. The void 248 is defined by a first housing wall 250 and a second housing wall 252. Each of the walls 250, 252 has a magnet element 254, 256, respectively, embedded therein. When the PCB 234 is positioned in aperture 240, the Hall Effect sensor 238 is positioned in the void 248 and subjected to a magnetic field created by the magnet elements 254, 256. As the arm 226 is rotationally displaced, the magnetic field is altered and the sensor produces a voltage related to the magnetic field thereby allowing a processing unit (not shown) coupled to the terminals 236 of the tape tensioner 222 to determine the position or rotational displacement of the arm 226. Although the illustrative tape tensioner 222 utilizes the Hall Effect sensor 238 and magnets 254, 256 to detect the rotational displacement of the arm 226, other methods of detecting the displacement of arm 226 may be used, for example a potentiometer relating the displacement of the arm 226 to a resistive value may be used. As a further example, an optical encoder may be used to detect the rotational displacement of the arm 226.

Figure 21:
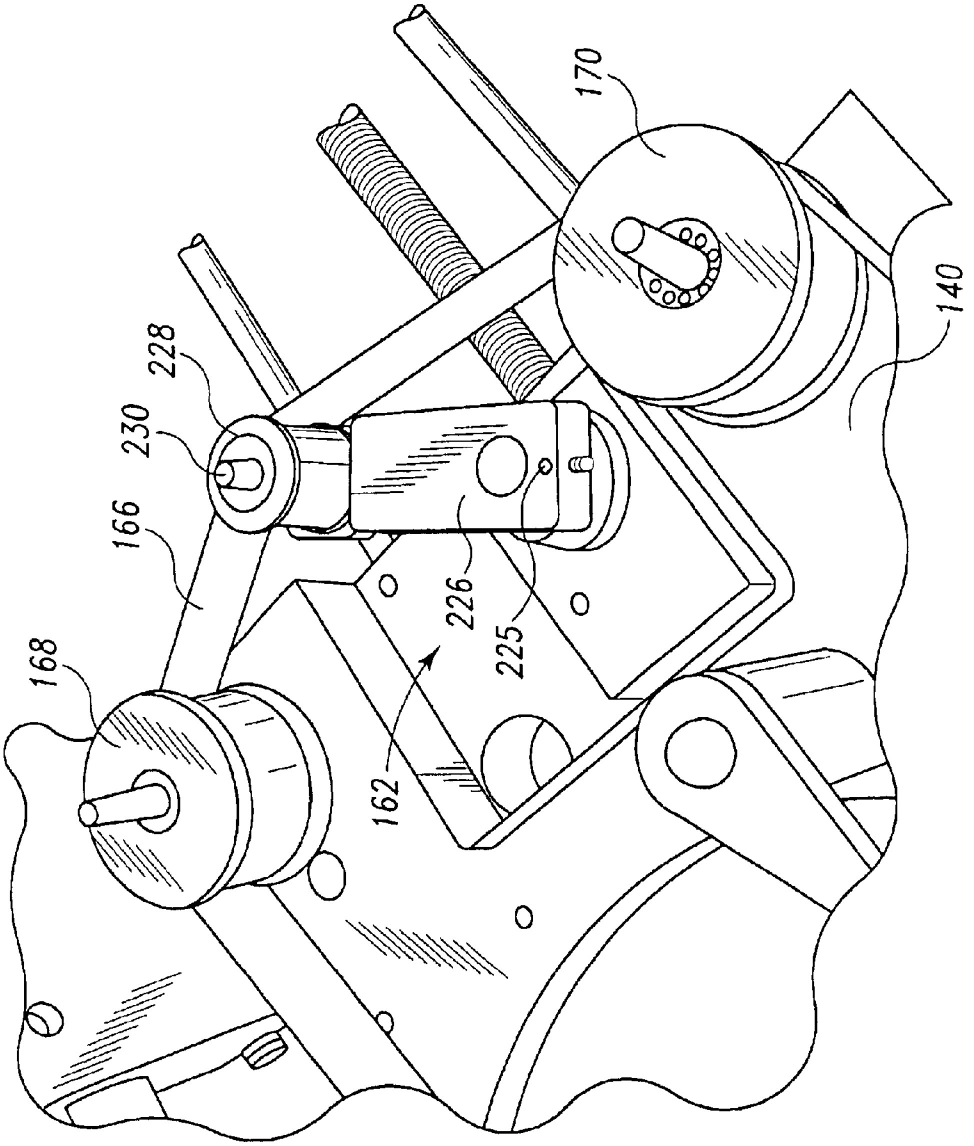
FIG. 21 is a fragmentary perspective view of a portion of the transport cart of FIG. 17 showing the tape tensioner in greater detail.
Figure 22:
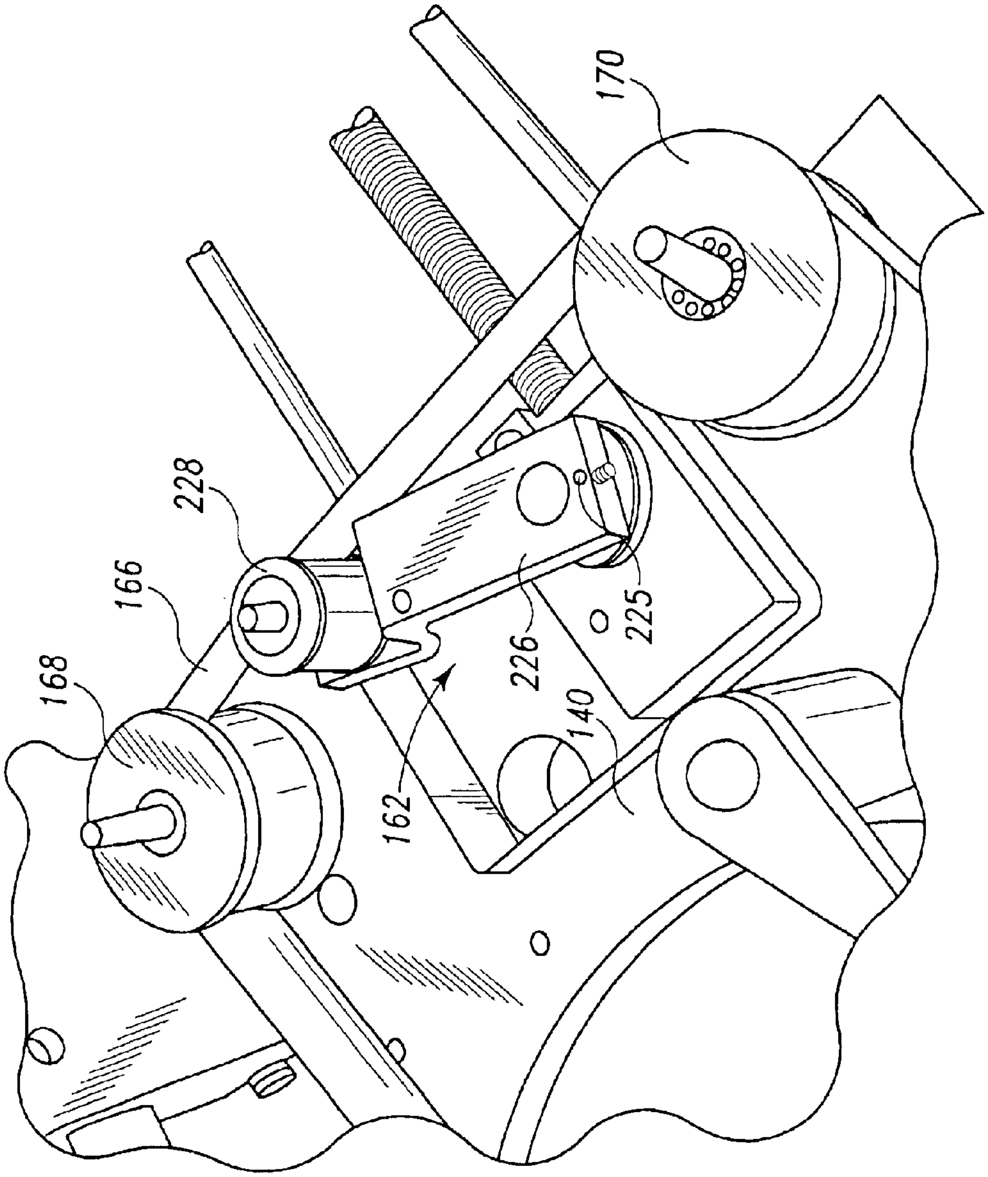
FIG. 22 is a view similar to FIG. 21, but showing the tape tensioner positioned in a rotated position by the tension in the sample substrate.
Figure 23:
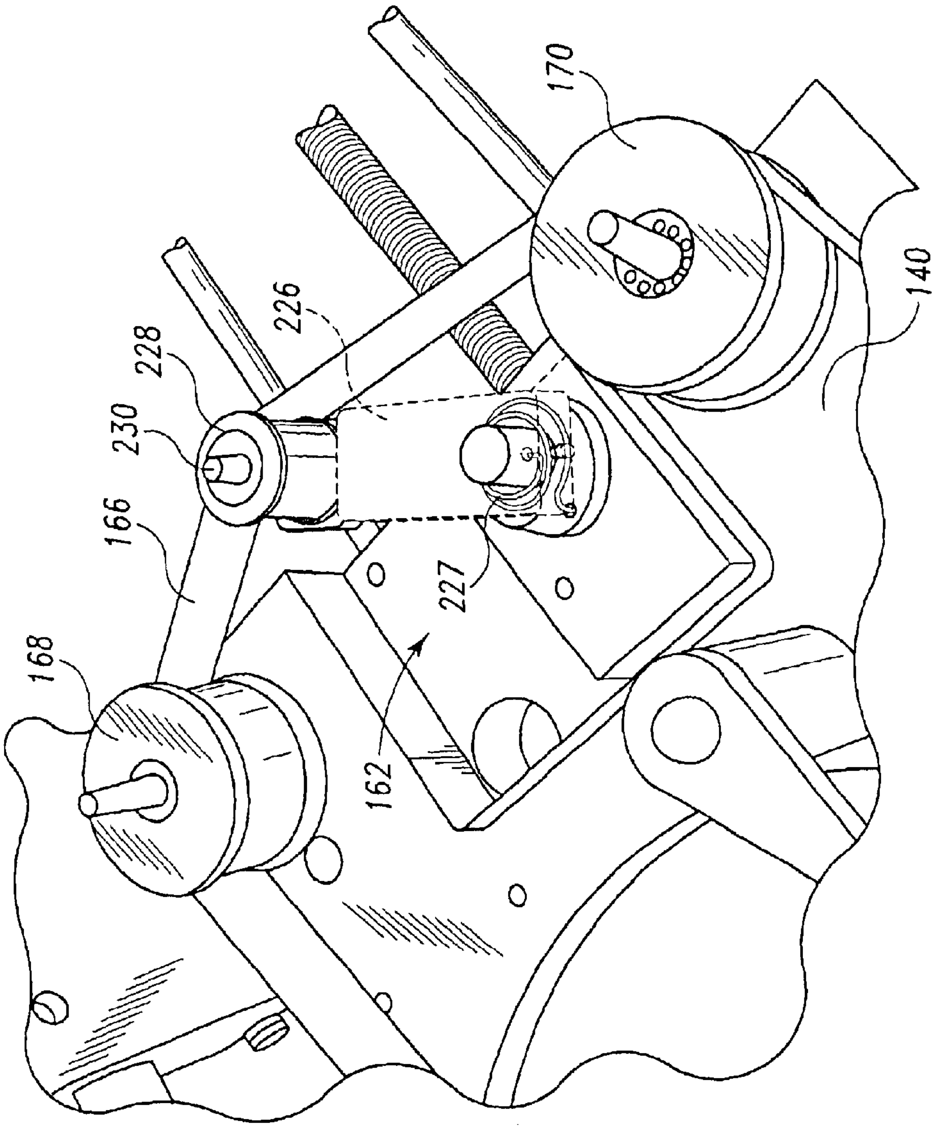
FIG. 23 is a view similar to FIG. 21, but showing the biasing spring of the tape tensioner.

Illustratively, the tape tensioner 222 is mounted on the platform 212 utilizing a number of mounting holes 232 defined in the body 224 and suitable screws, bolts, clamps, or other fastening mechanisms. The tape tensioner 222 is biased by biasing spring 227 as illustrated in FIG. 23. The biasing spring 227 is secured to the body 224 and the arm 226 and exerts a rotational bias on the arm 226. Illustratively, the arm 226 is biased in a clockwise direction. However, in some embodiments the arm 226 may be biased in the counterclockwise direction. Mechanical stops (not shown) may be used to limit the range of motion of the arm 226. When the sample cassette 112 is loaded onto the platform 212 of the transport cart 110, the tape tensioner 222 is positioned within the notch 162 of the platform 140 of the sample cassette 112, as shown in FIGS. 21 and 22. As described above, the sample substrate 166 exiting the supply reel 146 wraps partially around direction roller 168, and continues toward direction roller 170. The portion of sample substrate 166 traversing from direction roller 168 to direction roller 170 may come into contact with roller 228 of the tape tensioner 222. Illustratively, the clockwise spring bias of the arm 226 brings the tension roller 228 in contact with the sample substrate 166. As the tension of the sample substrate increases, the arm 226 is displaced in a counter-clockwise direction. The movement of the arm 226 alters the magnetic field affecting the Hall Effect sensor 238 and produces a signal relating to the degree of rotation of the arm 226. For example, as shown in FIG. 21, the tension of the sample substrate 166 may be relatively low thereby allowing clockwise rotation of the arm 226 of the tape tensioner 222. During the course of composition analysis, the tension of the sample substrate 166 may increase thereby displacing the arm 226 of the tape tensioner 222 in a counter-clockwise direction, as shown in FIG. 22. The detection of the amount of rotation of the arm 226 allows for the amount of tension in the sample substrate 166 to be determined. It should be understood that other types of tape tensioners 222, for example a potentiometer tape tensioner, would produce similar signals relating to the degree of rotation of the arm 226 and may be used in a similar manner.

As alluded to above, the processing unit (not shown) is coupled to the tape tensioner 222 thereby allowing for the detection and determination of the amount of tension in the sample substrate 166. The processing unit may alter the speed and direction of one or both of the motorized spindles 220 according to the amount of tension identified in the sample substrate 166 thereby maintaining a substantially constant tension in the sample substrate 166. The processing unit can alter the speed and direction of one or both of the motorized spindles 220 by controlling the motor and gear assembly 203. The motor and gear assembly 203 is coupled to the processing unit by a plurality of interconnects, illustratively wires 258, as shown in FIG. 24.

Figure 24:
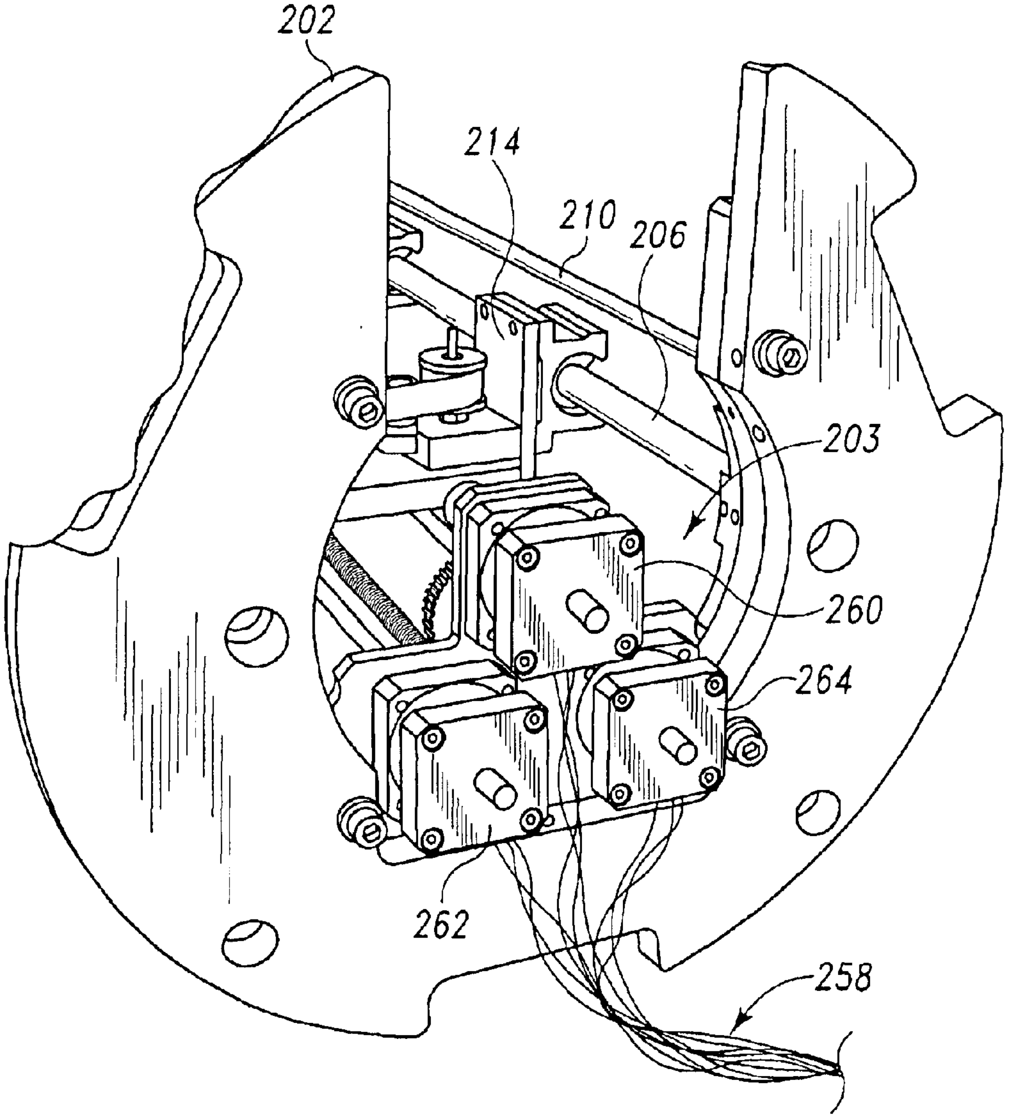
FIG. 24 is a rear perspective view of the transport cart and the sample cassette of FIG. 17.
Figure 25:
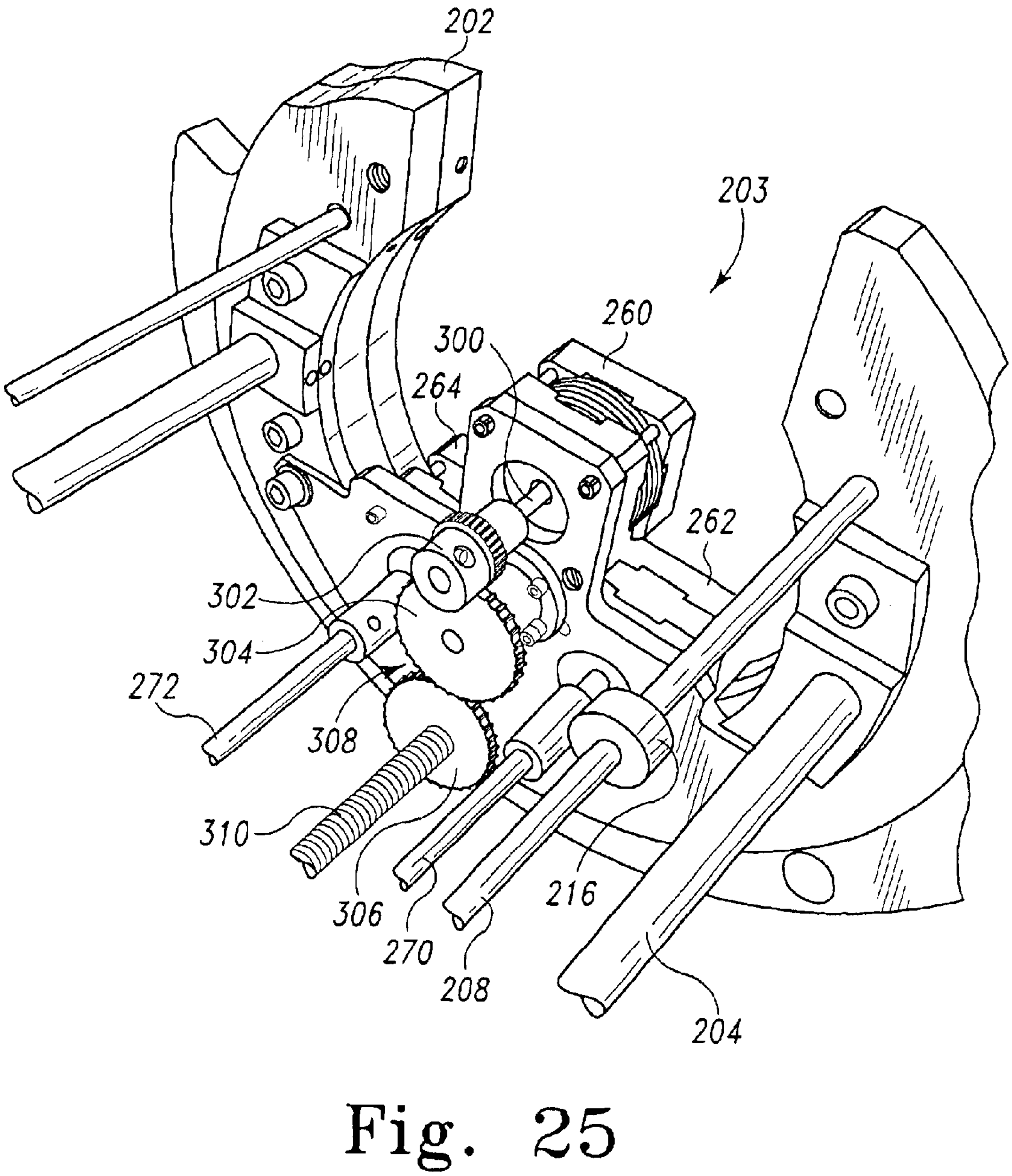
FIG. 25 is a fragmentary top elevational view of a portion of the transport cart of FIG. 17 showing the motor and gear assembly in greater detail.
Figure 26:
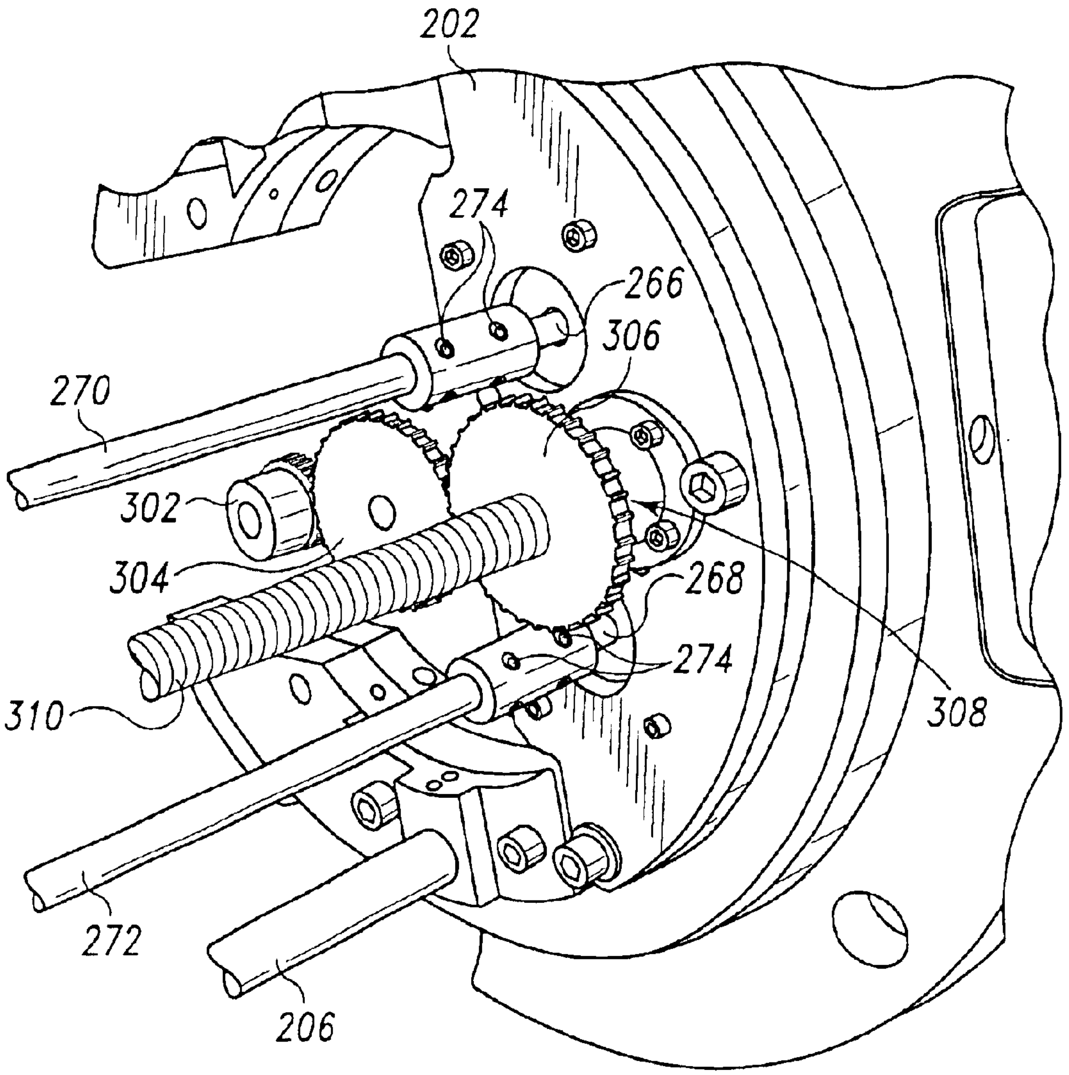
FIG. 26 is a fragmentary bottom elevation view of a portion of the transport cart of FIG. 17 showing the motor and gear assembly in greater detail.
Figure 27:
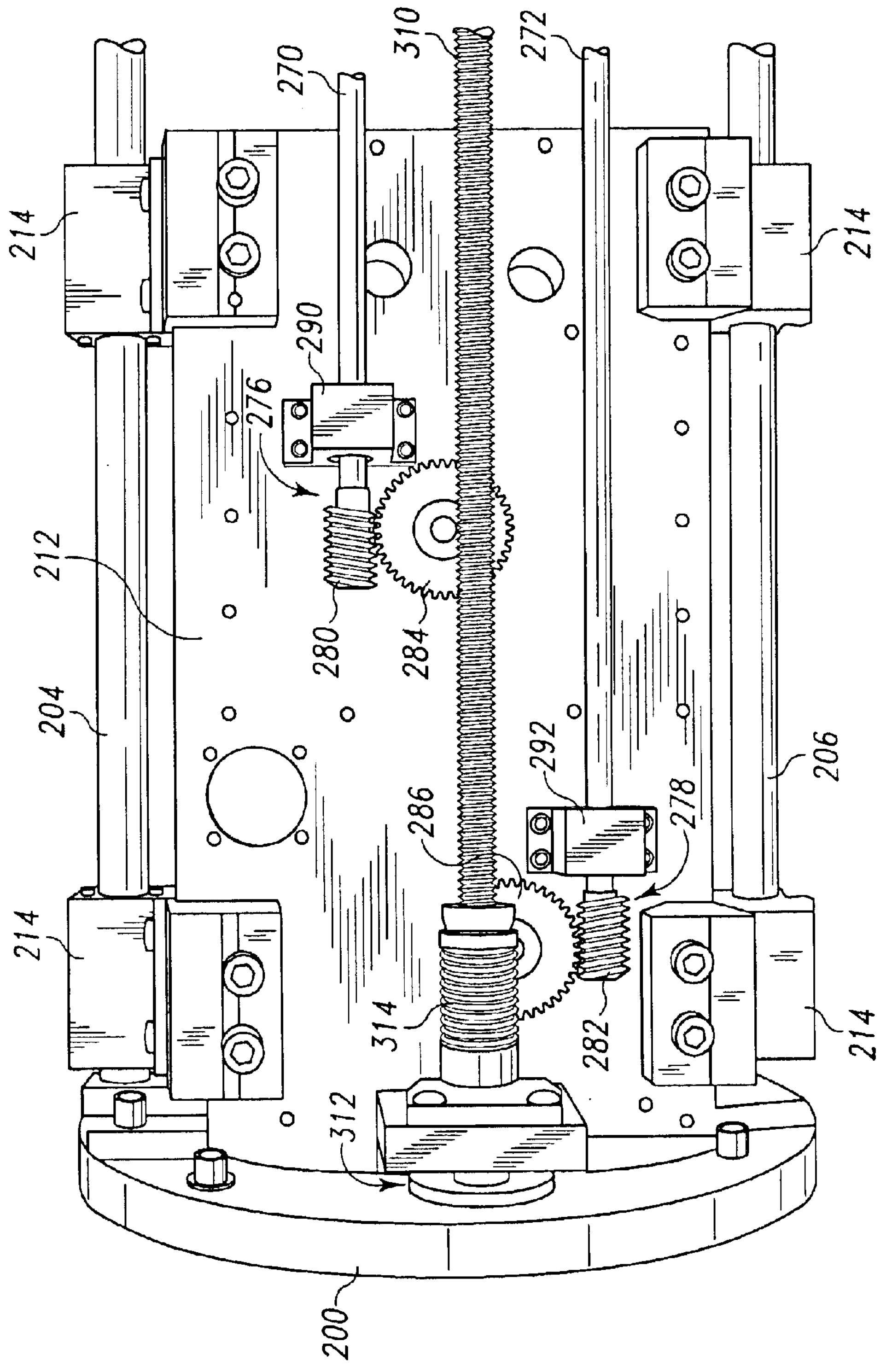
FIG. 27 is a fragmentary bottom elevational view of the transport cart of FIG. 17.

The motor and gear assembly 203 includes a platform motor 260, a first spindle motor 262, and a second spindle motor 264 as shown illustratively in FIG. 24–26. The spindle motors 262, 264 include spindle shafts 266, 268, respectively. The motor shafts 266, 268 of the spindle motors 262, 264 are coupled to extension rods 270, 272, respectively, by a pair of shaft connectors and a plurality of hex screws 274, as shown in FIGS. 25 and 26. Other methods of coupling rods 270, 272 to motor shafts 266, 268 may include bolts, clamps, and other fasteners. The extension rods 270, 272 extend outwardly from the motor shafts 266, 268 toward the front flange 200 terminating in rod ends 276, 278, respectively. The extension rods 270, 272 extend through support brackets 290, 292, respectively. The support brackets 290, 292 are coupled to the underside of the platform 212 and facilitate the alignment of the extension rods 270, 272 as the platform 212 is moved laterally toward and away from the front flange 200. Worms 280, 282 are coupled to the rod ends 276, 278, respectively, as shown in FIG. 27. Illustratively, the worms 280, 282 are pressure fitted on the rod ends 276, 278, however, other methods of coupling the worms 280, 282 to the rod ends 276, 278 are contemplated, for example, screws, bolts, and other fasteners may be used.

As shown in FIG. 27, when the platform 212 is positioned in its forward position, the worms 280, 282 engage gears 284, 286 thereby facilitating the rotation of the gears 284, 286 by the spindle motors 262, 264. Gears 284, 286 are individually coupled to one of the motorized reel spindles 220 through an access hole (not shown) in the platform 212. The spindles 220 are rotatably moved by the cooperation of the worms 280, 282 and the gears 284, 286. When the platform 212 is not in the forward position, the worms 280, 282 are disengaged from the gears 284, 286.

The platform motor 260 includes a motor shaft 300, as shown in FIG. 25. The motor shaft 300 is coupled to a first gear 302, as shown in FIGS. 24 and 25. The first gear 302 is meshed with a second gear 304, with the second gear 304 in turn being meshed with a screw gear 306. The screw gear 306 is coupled to a first end 308 of a lead screw 310. The first end 308 of the lead screw 310 is rotatably coupled to the rear flange 202. The lead screw 310 linearly extends from the rear flange 202 to the front flange 200. As shown in FIG. 27, a second end 312 of the lead screw 310 is rotatably coupled to the front flange 200. A lead screw nut 314 is threaded onto the lead screw 310 and secured to the platform 212, thereby facilitating the linear movement of the platform 212 by rotation of the screw gear 306. The lead screw nut 314 cooperates with the lead screw 310 to provide a driving force to platform 212 thereby moving platform 212 in a linear direction along the guide rails 204, 206. The platform motor 260 drives the lead screw 310 in a clockwise or counter-clockwise direction depending on the linear direction desired. Other methods for moving platform 212 may be used, for example, hydraulic motors, linear actuators, belt driven motor systems, etcetera.

An optical reader (not shown) may be coupled to the platform 212. Illustratively, when the sample cassette 112 is loaded onto the platform 212 of the transport car 110, the optical reader is positioned in the notch 164 of the platform 140 of the sample cassette 112 (see FIG. 12). The optical reader is positioned so that the sample substrate 166 can be optically read as it progresses along the above-described path. Illustratively, the optical reader includes a plurality of optical fibers. Scratch marks may be created on the sample substrate 166 by removing portions of the coating contained on one side of the sample substrate 166 thereby leaving a transparent area under each scratch mark. Alternatively, opaque marks may be deposited on uncoated tape. In either case, the indexing marks may be utilized for identification purposes, for example, to identify the particular sample or the position along the sample substrate 166. The optical reader is employed to detect the indexing marks as the sample substrate 166 passes in front of the optical reader. Accordingly, additional wires, electronics, and display devices may be used in conjunction with the optical reader to facilitate the detecting and displaying of identification information.

A method of analyzing the composition of a sample with MALDI mass spectrometer 100 generally begins with the depressurization of the ionization chamber 104 to a desired low pressure. To achieve such a low pressure in the ionization chamber 104, the gate door 124 is moved to its closed position and the ionization chamber 104 is evacuated with the vacuum system 119. Illustratively, the ionization chamber 104 is evacuated to a pressure of about $10^{-7}$ torr. A pressure of about $10^{-7}$ torr is generally adequate for proper mass spectrometer operation. The relatively low pressure utilized in the ionization chamber 104 may take a relatively long time to achieve depending upon the moisture present in the ionization chamber. Illustratively, a pressure of about $10^{-7}$ torr is obtainable in around three to twenty-four hours utilizing vacuum pumps having a capacity of about 230 liters per second.

Sample aliquots to be analyzed are deposited on the sample substrate 166. The sample aliquots may be deposited on the sample substrate 166 under atmospheric pressure conditions. The sample substrate 166 is then wound upon the supply reel 146. The supply reel 146 and the take-up reel 148 are then loaded on the sample cassette 112 and secured thereto by reel securing devices 142. A portion of the sample substrate 166 is then fed through the above-described path and wound upon the take-up reel 148. In particular, a leading portion of the sample substrate 166 is unwound from the supply reel 146 and fed across the rollers 168, 162, through the conduit 172, across the sample substrate stage 176, through the conduit 182, and wound upon the take-up reel 148, as shown illustratively in FIG. 12. Generally, such a leading portion of the sample substrate 166 is left devoid of sample aliquots to allow the winding of the leader portion onto the take-up reel 148 without the accidental removal of sample aliquots.

Once the reels 146, 148 are mounted on the sample cassette 112 and the sample substrate 166 is properly fed onto the take-up reel 148, the sample cassette 112 is loaded on the transport cart 110 ensuring that the tape tensioner 222 is properly in contact with a portion of the sample substrate 166. Once the sample cassette 112 is loaded upon the sample transport cart 110 and the gate door 124 is in a closed position, the sample chamber 108 is evacuated to a desired low pressure by the differential vacuum system 119. The magnitude of the low pressure is predetermined and may be based on considerations such as the length of time necessary to evacuate the sample chamber 108 and the amount of outgassing occurring from the sample substrate 166. The slow release of large amounts of gas that may be trapped in-between the layers of the wound sample substrate 166 may render the obtainment of very low pressures in the sample chamber 108 in a relatively short time period somewhat difficult. However, a pressure of about $10^{-5}$ torr is obtainable in the sample chamber 108 within a relatively short time period, illustratively about twenty minutes, utilizing vacuum pumps having a capacity of about 230 liters per second.

Figure 28:
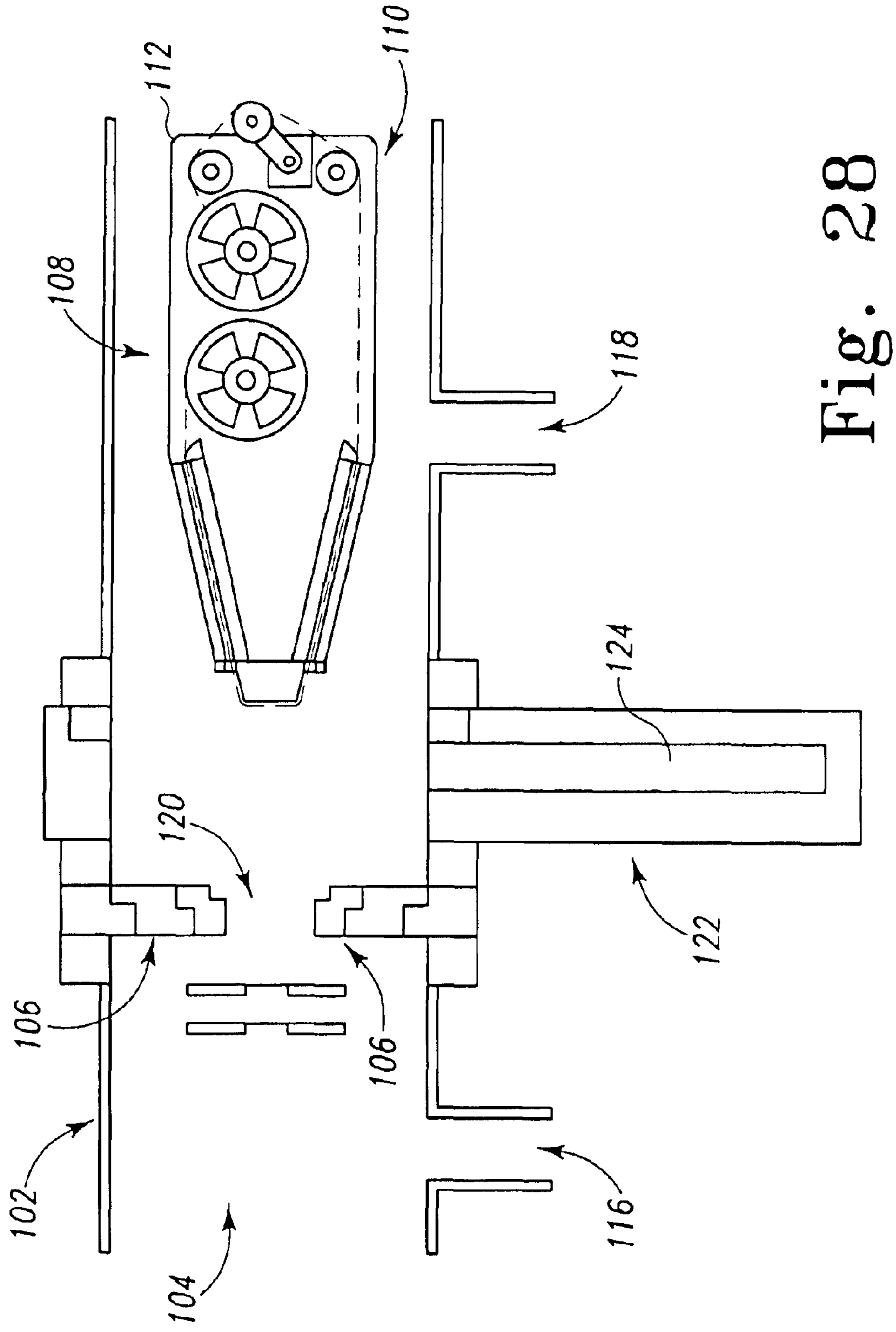
FIG. 28 is a diagrammatic view similar to FIG. 7, but showing the gate valve positioned in its open position.

Once the sample chamber 108 has been evacuated to a pressure of about $10^{-5}$ torr, the gate door 124 is moved to its open position as shown in FIG. 28. The platform motor 260 is engaged to rotate the first gear 302. The first gear 302 cooperates with the second gear 304 and the screw gear 306 to rotate the lead screw 310 in such a manner to move the lead screw nut 314, and hence the platform 212, in a direction toward the front flange 200. The platform 212 is moved in this manner until the forward most limit switch 218 comes into contact with the forward most collar 216. Once the forward most limit switch 218 is in contact with the forward most collar 216 the platform is halted and the sample cassette 112 confronts or abuts the interface wall 106, as shown in FIG. 29. Generally, the time span required to move the sample cassette 112 into such a position is short enough so as to only momentarily affect the pressure within the ionization chamber 104. Illustratively, the time span required to move the sample cassette 112 into position is about twenty seconds. When the sample cassette 112 is positioned in the forward position, the sample substrate stage 176 extends through the cassette-docking aperture 120 and into the ionization chamber 104. The restrictive passageways 172, 182 allow the sample substrate 112 to be advanced from the sample chamber 108 into the ionization chamber 104 and across the stage 176 thereby allowing for the analysis of the sample aliquots in the ionization chamber 104.

The cooperation between the sample cassette 112 and the interface wall 106 creates a substantially complete pneumatic seal. Illustratively, when the sample cassette 112 is in the forward position, the seal ring 177 is abutted against an inner portion 326 of the interface wall 106 forming a significantly complete pneumatic seal, as shown illustratively in FIG. 30. The restrictive passageways 174, 180 do allow a relatively small amount of pneumatic communication between the ionization chamber 104 and the sample chamber 108. However, the illustrative dimensions of the passageways 174, 180 provide for relatively low fluid conductance in the range of 0.23 liters per second. Illustratively, the relatively low conductance of 0.23 liters per second allows the sample chamber 108 to be held at the illustrative pressure of about $10^{-5}$ torr while the ionization chamber 104 is held at the lower illustrative pressure of about $10^{-7}$ torr.

When the sample cassette 112 is positioned such that the substrate stage 176 extends through the cassette-docking aperture 120, the worms 280, 282 are coupled to the gears 284, 286. As such, the spindle motors 262, 264 may be operated to rotate the extension rods 270, 272 coupled to the motor shafts 266, 268 of the spindle motors 262, 264. Rotating the extension rods 270, 272 rotates the worms 280, 282, the gears 284, 286, and thereby the motorized reel spindles 220. Rotating the reel spindles 220 indexes or otherwise advances the sample substrate 166 along the above-described path. Illustratively, the sample substrate 166 is initially advanced until a first sample aliquot is presented on the sample substrate stage 176 in the ionization target area.

Figure 30:
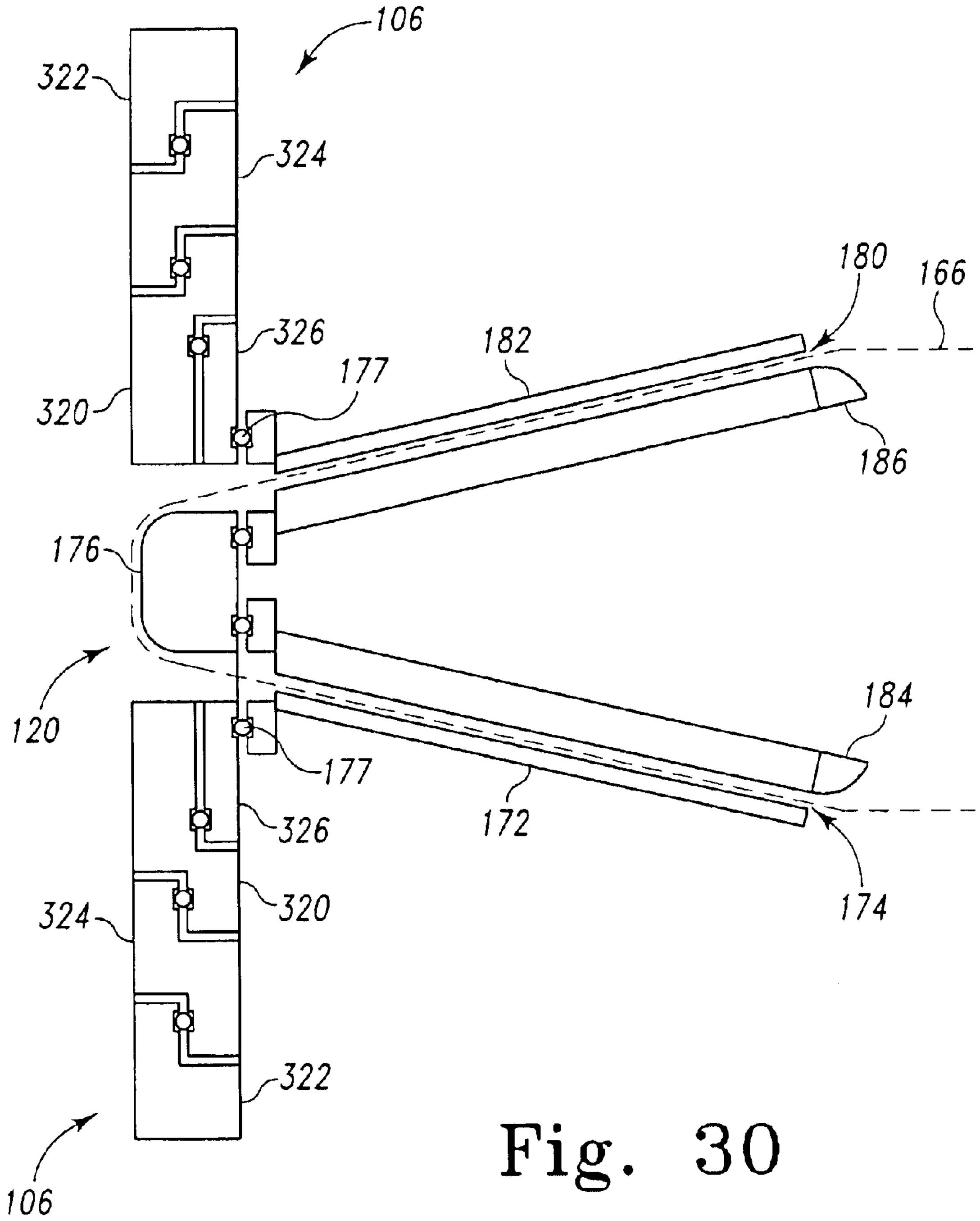
FIG. 30 is an enlarged view similar to FIG. 29 showing the sample stage extending through the interface wall.

Once the first sample aliquot is presented on the sample substrate stage 176, the first sample aliquot is ionized. During ionization, a high electrical potential of about 30,000 volts is applied to the sample aliquots that are being analyzed. To do so, as shown in FIG. 30, when the sample cassette 112 is positioned with the sample substrate stage 176 extending through the cassette-docking aperture 30, the stage 176 is in electrical contact with the electrically conductive ring 320 of the interface wall 106. Illustratively, the electrically conductive ring 320 is maintained at a potential of about 30,000 volts.

In cases where the sample substrate 166 includes a conductive coating, electrical arcing may occur when the sample substrate 166 is in close proximity to conductive surfaces. To reduce the possibility of arcing, portions of the sample cassette 112 may be constructed from insulating materials. For example, the conduits 172, 182 may be constructed from insulating materials or alternatively may be insulated from the sample substrate stage 176 by an insulating material.

Once the first sample aliquot has been ionized and analyzed, the sample substrate 166 is further indexed or otherwise advanced by rotation of the motorized reel spindles 220. The sample substrate 166 is advanced until a second sample aliquot is presented to the laser on the sample substrate stage 176. During such advancement of the sample substrate 166, the tape tensioner 222 senses the tension present in the sample substrate 166 by monitoring displacement of the arm 226. Such changes in rotational position of the arm 226, and hence the related tension of the sample substrate 166, may be detected by the processing unit (not shown). If the processing unit detects a tension level above a predetermined value, then one or more of the reel spindles 220 may be engaged to rotate one or both of the supply reel 146 and take-up reel 148 in a direction that restores the tape tension to the predetermined value thereby maintaining constant sample substrate tension. As such, the tape tensioner 222 may be used as part of a feedback loop. Moreover, as advancement of the sample substrate 166 is initiated by rotation of the supply reel 146, the tape tensioner 222 may be used to sense any slack in the sample substrate 166 as the supply reel 146 beings to rotate. The system responds to such feedback from the tape tensioner 222 by rotating the take-up reel 148 in the appropriate direction to increase the tension of the sample substrate 166 to a desired predetermined sample substrate 166 tension value thereby removing the slack.

The ionization, analysis, and propagation of the sample substrate 166 is repeated until all the sample aliquots deposited on the sample substrate 166 have been analyzed. At this time, the transport cart is moved in a linear direction away from the interface wall 106 by the rotation of the lead screw 310. The gate door 124 is moved to a closed position and the sample chamber 108 is pressurized. The sample cassette 112 may then be unloaded from the transport cart 110 and removed from the sample chamber 108. The reels 146, 148 may be removed from the sample cassette by rotating the reel securing devices 142. The reel containing the ionized sample aliquots may then be stored in an appropriate facility for later inspection.

There are a plurality of advantages of the concepts of the present disclosure arising from the various features of the apparatus and methods described herein. It will be noted that alternative embodiments of the apparatus and methods of the present disclosure may not include all of the features described yet still benefit from at least some of the advantages of such features. Those of ordinary skill in the art may readily devise their own implementations of the apparatus and methods of the present disclosure that incorporate one or more of the features of the present disclosure and fall within the spirit and scope of the invention defined by the appended claims.

For example, although the mass spectrometer described herein is a MALDI mass spectrometer, it should be appreciated that numerous of the features described herein may be used in the construction of other types of analysis systems. As such, the disclosure should not be interpreted as limited to any particular type of analysis system unless specifically recited in the claims.

What is claimed is:

1. A mass spectrometer, comprising:

a sample chamber configured to receive a number of samples for mass spectral analysis, the sample chamber adapted to be evacuated to a first pressure, an ionization chamber secured to the sample chamber, the ionization chamber adapted to be evacuated to a second pressure less than the first pressure, and a gate valve having a door, the gate valve being interposed between the sample chamber and the ionization chamber, the door of the gate valve being positionable between an open position and a closed position, wherein (i) when the door is positioned in the open position the sample chamber is in fluid communication with the ionization chamber and (ii) when the door is in the closed position the sample chamber is substantially in fluid isolation from the ionization chamber, a sample substrate having a number of samples disposed thereon, the sample substrate positioned in the sample chamber when the door is positioned in the closed position, and a portion of the sample substrate positioned in the ionization chamber when the door is positioned in the open position, the sample substrate comprising a tape having a first end thereof secured to a supply reel and a second end thereof secured to a take-up reel, and both the supply reel and the take-up reel positioned in the sample chamber, a portion of the tape between the supply reel and the take-up reel is positioned in the ionization chamber when the door is positioned in the open position.

2. A MALDI mass spectrometer, comprising:

a sample chamber, an ionization chamber, and a valve positioned between the sample chamber and the ionization chamber, the valve being operable between (i) an open valve position in which the sample chamber is in fluid communication with the ionization chamber, and (ii) a closed valve position in which the sample chamber is isolated from the ionization chamber, a sample substrate adapted to have a number of samples disposed thereon, the sample substrate positioned in the sample chamber when the valve is positioned in the closed valve position, and a portion of the sample substrate adapted to be positioned in the ionization chamber when the valve is positioned in the open valve position, the sample substrate comprising a tape having a first end thereof secured to a supply reel and a second end thereof secured to a take-up reel, both the supply reel and the take-up reel adapted to be positioned in the sample chamber, and a portion of the tape between the supply reel and the take-up reel adapted to be positioned in the ionization chamber when the valve is positioned in the open valve position.

3. The MALDI mass spectrometer of claim 2, further comprising a vacuum system, the vacuum system being operable to maintain the ionization chamber and the sample chamber at different pressures.

4. The MALDI mass spectrometer of claim 3, wherein the vacuum system is operable to maintain the ionization chamber at a lower pressure relative to the sample chamber.

5. The MALDI mass spectrometer of claim 3, wherein the vacuum system is operable to maintain the ionization chamber at a lower pressure relative to the sample chamber when the valve is positioned in the closed valve position.

6. The MALDI mass spectrometer of claim 3, wherein the vacuum system is operable to maintain the ionization chamber at a lower pressure relative to the sample chamber when the valve is positioned in the open valve position.

7. A method of performing mass spectral analysis, the method comprising the steps of:

positioning a number of samples for mass spectral analysis in a sample chamber, the positioning step comprising disposing the number of samples on a tape, evacuating the sample chamber to a first pressure subsequent to positioning the number of samples therein, subjecting the number of samples positioned in the sample chamber to the first pressure for a time period, and advancing the number of samples from the sample chamber to an ionization chamber after the time period, the advancing step comprising advancing the tape to the ionization chamber, wherein the ionization chamber has a second pressure therein that is less than the first pressure.

8. The method of claim 7, wherein advancing the tape to the ionization chamber comprises advancing the tape from a supply reel positioned in the sample chamber to the ionization chamber.

9. The method of claim 7, wherein advancing the tape to the ionization chamber comprises advancing the tape from a supply reel positioned in the sample chamber, through the ionization chamber, and onto a take-up reel positioned in the sample chamber.

10. A method for performing mass spectral analysis, the method comprising the steps of:

disposing a number of samples for mass spectral analysis onto a tape, wherein the disposing of the number of samples onto the tape occurs under atmospheric pressure, positioning the number of samples in a sample chamber, evacuating the sample chamber to a first pressure subsequent to positioning the number of samples therein, subjecting the number of samples positioned in the sample chamber to the first pressure for a time period, and after the time period, advancing the tape, one sample at a time from the sample chamber to an ionization chamber, wherein the ionization chamber has a second pressure therein that is less than the first pressure.

11. The method of claim 10, wherein advancing the tape to the ionization chamber comprises advancing the tape from a supply reel positioned in the sample chamber to the ionization chamber.

12. The method of claim 10, wherein advancing the tape to the ionization chamber comprises advancing the tape from a supply reel positioned in the sample chamber, through the ionization chamber, and onto a take-up reel positioned in the sample chamber.

13. A MALDI mass spectrometer, comprising:

a vacuum system, a sample chamber in fluid communication with the vacuum system, the sample chamber being evacuated to a first pressure by the vacuum system, an ionization chamber in fluid communication with the vacuum system, the ionization chamber being evacuated to a second pressure by the vacuum system, the second pressure being less than the first pressure, and a gate valve having a door, the gate valve being interposed between the sample chamber and the ionization chamber, the door of the gate valve being positionable between an open position and a closed position, wherein (i) when the door is positioned in the open position the sample chamber is in fluid communication with the ionization chamber and (ii) when the door is in the closed position the sample chamber is substantially in fluid isolation from the ionization chamber, a tape having a number of samples disposed thereon, the tape having a first end thereof secured to a supply reel and a second end thereof secured to a take-up reel, both the supply reel and the take-up reel positioned in the sample chamber, and a portion of the tape between the supply reel and the take-up reel adapted to be positioned in the ionization chamber when the door is positioned in the open position.

* * * * *